(12) United States Patent
Soroka et al.

(10) Patent No.: US 9,230,552 B2
(45) Date of Patent: *Jan. 5, 2016

(54) ADVANCED ENCODING OF MUSIC FILES

(71) Applicant: Universal Music Group, Inc., Santa Monica, CA (US)

(72) Inventors: Howard Soroka, Topanga, CA (US); Christopher Horton, Culver City, CA (US)

(73) Assignee: UNIVERSAL MUSIC GROUP, INC., Santa Monica, CA (US)

( * ) Notice: Subject to any disclaimer, the term of this patent is extended or adjusted under 35 U.S.C. 154(b) by 285 days.

This patent is subject to a terminal disclaimer.

(21) Appl. No.: 13/908,734

(22) Filed: Jun. 3, 2013

(65) Prior Publication Data

US 2013/0294606 A1    Nov. 7, 2013

Related U.S. Application Data

(63) Continuation of application No. 13/495,645, filed on Jun. 13, 2012, now Pat. No. 8,457,977, which is a continuation of application No. 12/470,568, filed on May 22, 2009, now Pat. No. 8,204,755.

(51) Int. Cl.
*G10L 19/008* (2013.01)
*G11B 27/10* (2006.01)
*G11B 27/30* (2006.01)

(52) U.S. Cl.
CPC ............ *G10L 19/008* (2013.01); *G11B 27/105* (2013.01); *G11B 27/3027* (2013.01)

(58) Field of Classification Search
CPC ...................................................... G10L 19/008
USPC ............................................. 704/500; 381/22
See application file for complete search history.

(56) References Cited

U.S. PATENT DOCUMENTS

| | | | |
|---|---|---|---|
| 7,599,610 B2 | 10/2009 | Benyamin et al. |
| 7,831,727 B2 | 11/2010 | Brodersen et al. |
| 7,986,913 B2 | 7/2011 | Wang |
| 7,996,869 B2 | 8/2011 | Tu et al. |
| 8,055,654 B2 | 11/2011 | Chu |

*Primary Examiner* — Susan McFadden
(74) *Attorney, Agent, or Firm* — K&G Gates LLP

(57) ABSTRACT

A system for the playback of content files includes a memory storing a content file including a plurality of stems, each stem encoding a portion of the audio of a sound recording, multiple stems in the plurality of stems representing different portions of the sound recording for the same time period, the content file also including a set of instructions controlling playback of the stems. A decoder is configured to decode the stems according to the set of instructions to create an audio output signal.

22 Claims, 10 Drawing Sheets

ADVANCED ENCODING OF MUSIC FILES

PRIORITY CLAIM AND CROSS-REFERENCE TO A RELATED APPLICATION

This application is a continuation of and claims priority to pending U.S. patent application Ser. No. 13/495,645 filed on Jun. 13, 2012, which is a continuation of U.S. patent application Ser. No. 12/470,568, filed on May 22, 2009, now U.S. Pat. No. 8,204,755. The entire disclosure of both of these applications is incorporated by reference herein.

BACKGROUND

Music has traditionally been distributed to consumers in stereo format. Whether recorded as an analog signal on audio cassette tape, or digitally encoded on a CD, music has typically been produced and distributed for presentation as 2-channel stereo sound. Such music, once distributed, does not facilitate flexible playback; and although music is distributed in other forms, for example the Dolby 5.1 surround sound format which encodes an audio recording in six distinct channels, music encoded in those other formats is equally inflexible. Example embodiments of the present invention address this inflexible production and distribution of music.

SUMMARY

Example embodiments of the present invention may provide systems and procedures for the creation and rendering of flexible content files. For instance, an example embodiment may provide for a system for creating a content file which may include a storage unit storing a plurality of segments of recorded audio; an input device configured to receive a user input; and an encoding system configured to encode a content file; wherein the encoding system may be configured to encode the segments into a plurality of stems, the stems each encoding a portion of the audio of a sound recording; wherein the encoding system may be configured to generate a set of instructions based on the user input, the instructions configured to guide assembly of the stems during playback; wherein the encoding system may be configured to encode the plurality of stems and the set of instructions together creating the content file; and wherein the content file may further include a rights management identifier associated with the set of instructions.

Some example systems may further include an audio playback device configured to play back the segments according to the set of instructions.

In some example systems, the encoding system may be further configured to encode additional information in the content file, and the encoding system may be further configured to associate the additional information with a stem. In example systems, the additional information may be one of metadata, copyright information, and musical information.

In some example systems, a first stem in the plurality of stems may be an alternate to a second stem in the plurality of stems, and the instruction set may be configured to guide assembly of the stems during playback such that the content of the first stem and the second stem is not rendered at the same time.

In some example systems, the encoding system may be further configured to generate a second set of instructions and to encode the second set of instructions in the content file. In example systems, the set of instructions may be configured to guide assembly of the stems during playback in a first output format and the second set of instructions may be configured to guide assembly of the stems during playback in a second output format. In example systems, the set of instructions is configured to guide assembly of the stems during playback of a first version of the sound recording and the second set of instructions is configured to guide assembly of the stems during playback of a second version of the sound recording. And in example systems, the first version of the sound recording may be a full version and the second version of the sound recording may not include a portion of the sound recording.

In some example systems, the set of instructions may be a default set of instructions. In example systems, the default set of instructions may be immutable.

Another example embodiment may provide a procedures for creating a content file, which may include receiving, with a mixing and mastering system, audio content; encoding, with the mixing and mastering system, the audio content into a plurality of stems; receiving, with the mixing and mastering system, an instruction set which, when executed on a rendering manager, causes the plurality of stems to be rendered in an audio output format; encoding, with the mixing and mastering system, the plurality of stems and the instruction set into a content file, with the mixing and mastering system, wherein the content file includes a rights management identifier associated with the instruction set; and storing the content file on a storage device.

Some example procedures, may further include encoding additional information in the content file, and associating the additional information with a stem. And in some example procedures the additional information may be one of metadata, copyright information, and musical information.

In some example procedures a first stem in the plurality of stems may be an alternate to a second stem in the plurality of stems, and when executed, the instruction set may cause the stems to be rendered such that the first stem and the second stem are not rendered at the same time.

Some example procedures may further include receiving a second instruction set, and encoding the second instruction set in the content file. In some example procedures the instruction set, when executed, may cause the stems to be rendered in a first output format and the second instruction set, when executed, may cause the stems to be rendered in a second output format. In some example procedures the instruction set, when executed, may cause the stems to be rendered as a first version of a sound recording and the second instruction set, when executed, may cause the stems to be rendered as a second version of a sound recording. And in example procedures the first version of the sound recording may be a full version and the second version of the sound recording may not include a portion of the sound recording.

In some example procedures the instruction set may be a default instruction set.

In some example procedures receiving the instruction set may include automatically generating an instruction on the mixing and mastering station.

In some example procedures, receiving the instruction set may include receiving user input directing creation of the instruction set.

Another example embodiment may provide for a system for the playback of content files which may include a storage unit storing at least one content file, the content file containing both a plurality of stems, each encoding a portion of the audio of a sound recording, and a set of instructions; a decoder configured to decode the content file; and an output device; wherein the decoder may be configured to decode the stems, according to the set of instructions, to create an audio output; and wherein the output device may be configured to output the audio output.

Some example systems may be embedded in an audio device.

In some example systems, the content file may further include a second set of instructions. In example systems, the decoder may be further configured to choose a set of instructions based on an environmental parameter.

In some example systems, the set of instructions may be a default set of instructions. In example systems, the default set of instructions may be immutable. And in example systems, the default set of instructions may be configured to create an audio output in a 2-channel stereo format.

Some example systems may further include a user interface configured to accept a user request for content. And in example systems, the decoder may be further configured to choose the content file and the set of instructions based on the user request for content.

Some example systems may further include a rights management database, wherein the decoder may be further configured to determine whether creation of the audio output is permitted by the rights management database. In example systems, the rights management database may contain a record associated with a stem. And in example systems the rights management database may contain a record associated with the set of instructions.

Some example systems may further include a display, where the content file may further contain additional information associated with a portion of the content file, and the display may be configured to display the additional information. In example systems, the additional information may be sheet music associated with a stem. And in example systems, the additional information may be metadata associated with a stem.

In some example systems, the decoder may be further configured to process the set of instructions conforming to a predetermined standard to create the audio output.

In some example systems, the plurality of stems together may encode a complete sound recording, and the set of instructions may be configured to create an audio output containing less than the complete sound recording.

Another example embodiment may provide for a procedure for rendering a file which may include receiving a content file including a plurality of stems containing audio content and a set of instructions; creating an audio output signal from the content of the stems according to the set of instructions; and rendering the audio output signal.

In some example procedures, the content file may contain a second set of instructions. Example procedures may further include choosing a set of instructions based on an environmental parameter. And example procedures may further include choosing a set of instructions based on a default parameter.

Some example procedures may further include receiving a user request for content. And example procedures may further include choosing the content file and the set of instructions based on the user request for content.

Some example procedures may further include determining whether rendering of the audio output signal is permitted by a rights management database. In example procedures, the rights management database may contain a record associated with a stem. And in example procedures the rights management database may contain a record associated with the set of instructions.

Some example procedures may further include displaying additional information associated with a portion of the content file, the additional information contained in the content file.

In some example procedures the set of instruction may be a default set of instructions. In example procedures the default set of instructions may be immutable. And in example procedures, the default set of instructions may be configured to create an audio output in a 2-channel stereo format.

Some example procedures may further include displaying additional information contained in the content file and associated with a portion of the content file. In example procedures the additional information may be sheet music associated with a stem. And in example procedures the additional information may be metadata associated with a stem.

In some example procedures, the set of instructions may be used to create the audio output signal conforming to a predetermined standard.

In some example procedures, the plurality of stems together may encode a complete sound recording, and the set of instructions may be configured to create an audio output signal containing less than the complete sound recording.

Another example embodiment may provide a system for creating a content file which may include an element for storing a plurality of segments of recorded audio; and element for receiving a user input; and an element for encoding a content file; wherein the element for encoding the content file may be configured to encode the segments into a plurality of stems, the stems each encoding a portion of the audio of a complete recording; wherein the element for encoding the content file may be configured to generate a set of instructions based on the user input, the instructions configured to guide decoding of the stems during playback; and wherein the element for encoding the content file may be configured to encode the plurality of stems and the set of instructions together creating the content file.

Another example embodiment may provide a system for the playback of content files which may include an element for storing at least one content file, the content file containing both a plurality of stems, each encoding a portion of the audio of a sound recording, and a set of instructions; an element for decoding the content file; and an output element; wherein the element for decoding the content file may be configured to decode the stems, according to the set of instructions, to create an audio output; and wherein the output element may be configured to output the audio output.

Example embodiments of the present invention may also provide for articles of manufacture, which may include a computer readable medium storing a plurality of machine-executable instructions which, when executed by a computer, are configured to cause a computer to perform any of the methods and procedures disclosed herein.

Example embodiments of the present invention may also provide for an article of manufacture, which may include a computer readable medium storing a content file including a stem encoding at least a portion of the audio of a sound recording; a first instruction set configured to guide decoding of the stem during playback in a first format; and a second instruction set configured to guide decoding of the stem during playback in a second format. In some examples, the content file may further include a rights management identifier associated with the first set of instructions. And in some examples, the content file may further include a rights management identifier associated with the stem.

BRIEF DESCRIPTION OF THE DRAWINGS

The present invention will be more readily understood from a detailed description of the preferred embodiments taken in conjunction with the following figures.

DETAILED DESCRIPTION OF EXAMPLE EMBODIMENTS

Figure 1:
FIG. 1 illustrates an example content file in accordance with an example embodiment of the present invention.

Example embodiments of the present invention may provide systems and methods which may enable music, and other media, to be created, distributed, and presented to consumers in a flexible fashion, and which may allow users to easily and effectively access media in a format most suitable to their needs. In addition, example embodiments may provide consumers with features not typically made available to them. In order to provide content flexibly, example embodiments of the present invention may provide for the encoding of media content, including sound recordings, into versatile content files, and may provide systems to create, edit, and use those content files. It is noted that the example embodiments of the present invention described below are primarily described with reference to sound recordings and musical works. It is to be understood, however, that the present invention is not so limited and that other example embodiments extend to media of any kind, including video, interactive media, etc.

Stems

In example embodiments of the present invention, audio content may be encoded in content files, which may contain more than the traditional two channels of recorded audio. Rather, in embodiments of the present invention, audio content may be encoded in a content file as an arbitrary number of stems. Each such stem may represent some component of the recorded audio. For instance, a song may be encoded in several stems. One stem may encode all of the vocals, while another stem may encode the percussion instruments, etc. Any convenient organization of the media content into stems may be supported, and, for instance, a musical work need not be divided into stems simply across instruments or instrument types. For instance, a content file may contain stems representing spatial arrangements of sound, versions of content, time segments, or other conveniently organized stems. In this way, a musical work, or other content, may be divided across multiple stems. Thus, in some embodiments it may be that no single stem in a content file contains all of the information needed to render, for example, a musical work. Some or all such stems in the content file, however, may be played back in some combination to produce the musical work.

In some examples, each of the stems encoded in the content files may themselves be encoded using any acceptable format. Individual stems need not be encoded in the same manner as other stems in the same file and need not even be encoded at the same bitrate. For example, if a content file contains five stems, four of those stems may be encoded in MP3 format while the fifth may be encoded in WAV format. Such stems may also be encoded with information required to achieve consistent playback of multiple stems. For example, each stem may be encoded with a time signal, which may be used to synchronize playback of multiple stems. Any other information required may also be encoded with or within the stems.

It is also noted that individual stems in a file need not even encode content of the same type. For instance, a content file may encode several stems of audio content. Such stems may, for example, encode a song. In addition, another stem or stems may encode video information. Such stems might, for example, provide the video portion of a music video which might be capable of being presented along with the audio recorded in the remaining stems. In other examples, some stems may encode content which may be considered secondary to the primary content encoded in the content file. For instance, a content file encoding a song might include a stem or stems encoding an interview with an artist discussing the making of the song.

Instruction Sets

In addition, each file may contain one or more sets of instructions capable of controlling playback. Such sets of instructions may control the manner in which a decoding system, referred to herein as a "rendering manager," decodes and assembles the content encoded in a content file for presentation. Each content file may be capable of containing any number of instructions sets, where each instruction set may be capable of presenting the encoded content in a particular way. For example, one set of instructions included in an example content file may cause a rendering manager to assemble the stems of that content file to create a 2-channel stereo form of the recorded content for playback. The same content file, however, may also contain instructions which may cause a rendering manager to decode and assemble the content encoded in the stems for playback in Dolby 5.1 format. As discussed below, instruction sets are not limited to simply controlling multi-channel presentations, but may control all aspects of presentation and may facilitate features not previously provided for by current music distribution systems.

In order to accommodate multiple instruction sets more easily, a content file may contain a default instruction set. For example, a content file encoding a song may include instructions to provide playback in both a 2-channel stereo and a 6-channel surround sound format. The content file may, however, contain an indication that the 2-channel stereo instructions are default instructions to be used unless an indication otherwise is received. Thus a content file may act just as a standard MP3 recording might normally act, enabling the playback of standard 2-channel audio without further action by a user. The file might, however, also contain instructions and content to support other formats. Those instructions might be used either when manually requested by a user, or when a certain condition is sensed by playback equipment. For example, when the playback equipment is capable of rendering 6-channel audio, the equipment itself may be able to signal that fact to a rendering manager which may then provide 6-channel audio using the alternate instructions. In addition, multiple defaults could be set. For example, a first default could be configured for all equipment. In addition, a second default could be set that would be used when equipment of a certain capability is detected. Other sets of instructions could also be provided, however, which may provide additional features beyond those provided for in the default instruction sets. In addition, the setting of a default instruction set may be used for instruction sets that differ in varying ways, and is not limited to instruction sets based on supported hardware. For instance, a content file may include the stems for both a studio and a live version of a song, as well as instruction sets to present both versions. In such an example, the instruction set controlling playback of the studio version may be set as a default instruction set, while the other set or sets may be chosen by a user.

In addition, some default instructions sets, and instruction sets generally, may be made immutable. For example, a particular default instruction set distributed in a content file may be marked as immutable, preventing the instruction set from being altered in the future, or from having its default status changed. By marking instruction sets immutable, content authors can ensure that content files contain in the instructions necessary to playback content, for example a musical work, in a form intended by the content author. That is, one or more "official" versions of a piece of content may be included in a content file, which cannot be altered after distribution of the content file.

Example instruction sets may include instructions which may facilitate the decoding of stems and combinations of stems into a format for output and presentation to a user. For example, a content file may encode a song, with audio content divided into six stems. As an example, one stem may encode a rhythm guitar portion of the song, a second may encode a lead guitar portion, a third may encode a percussion portion, a fourth may encode bass instruments, a fifth may encode vocals, and a sixth may encode alternative "edited" version of the vocals (meaning sung or spoken lyrics which do not contain potentially offensive language, to be substituted in place of original "explicit" lyrics when desired by a user). A content file including such stems may include one or more sets of instructions for controlling the playback of those stems.

For instance, using the example above, a set of instructions may exist within the content file including the example stems which may control playback of the stems in an "explicit," stereo format. Such an instruction set may include instructions indicating sound level adjustments for each stem (or portion of a stem). For instance, an instruction set may indicate that the first stem is to be played back at the level recorded while the level of the second stem is to be increased by 2 dB. Such instructions may be applied at different times throughout playback. For instance, the level of the second stem may be raised again to 3 dB higher beginning 20 seconds into playback. In addition, instructions altering level may affect only some portions of each stem. For instance, an instruction may lower the level of all portions of the third stem that happen to fall below a certain frequency, for example 400 Hz.

Example instructions may also control the temporal synchronization of stems. For example, a set of instructions may include instructions to start and stop the playback of a stem, or portion of a stem, at specified times. For instance, in the example, the first stem may be made to begin playback at the beginning of the overall presentation and continue to play until the end. On the other hand, the second stem may be instructed to begin playback only after 0.5 seconds has elapsed. Other instructions may indicate that stems are to stop and restart, or may impose any controls possible on the time of playback of a particular stem. It is noted here that if a stem is played back multiple times, instructions of any kind may apply to each of those uses individually. For instance, if the example song is to be played back in a 6-channel surround sound format, an instruction set may indicate that a particular stem is to be played back on two distinct channels. The time at which playback starts may be different for each channel however. Thus one channel may be delayed relative to the other channel.

Other instructions may control the rate of playback of each stem, or portions of each stem. For instance, such instructions may indicate that the first stem is to be played back as recorded. Another instruction, however, may indicate that the second stem is to be played back faster or slower than recorded by a specified factor. Other instructions for coordinating the timing of playback of various stems may also be included.

In other examples, instructions may be included which may adjust the frequencies of various stems or portions of stems. For example, an instruction may indicate that the frequencies of certain sounds encoded in the first stem are to be increased by a specified degree. Other instructions might provide that certain frequency sound within a particular stem is to be played back at a level different than the remainder of the stem or is not to be played back at all. Example instructions may affect all parts of a stem or may affect only portions of a stem, identified by time, frequency, or any other measure.

Example instructions may also indicate how stems are to be presented in a particular format. For example, if the target format is 2-channel stereo, the instructions may include instructions to indicate which channel each stem is to be played into. For instance, example instructions may indicate that the first stem is to be played back on the left channel only, while the second stem is to be played back on both right and left channels. In addition, all of the other instructions discussed herein may be applied to specific channels. For instance, an instruction may indicate that the first stem is to be played back on both channels but that playback on the left channel is to be delayed, for example by 0.2 seconds. Other instructions may provide that the level of playback of a stem on a particular channel is to be adjusted, or may apply other rules. In addition, such instructions are not limited to the 2-channel stereo format, or to any particular format at all. For instance other instructions may instruct a decoder to decode the same stems into a Dolby 5.1 format and may therefore describe playback on each of the 6 channels. In addition, other properties of the target format may be controlled.

In addition, in some example embodiments instruction sets may be included in a content file which may provide for different presentations based on elements of the playback environment. For instance, an instruction set may be provided for playback on a headset. Such an instruction set may include specialized rules to account for the nature of the headset. For instance, the instruction set may adjust the levels of portions of the stems played back in order to compensate for the fact that headphones are less able to reproduce low frequency sound than a home entertainment system with large speakers. Such instruction sets may be labeled with identifiers which may enable rendering managers to choose between them based on their intended use. For instance, the example instruction set above may include a "headphone" label, enabling a rendering manager to choose that instruction set when headphones are used for sound production.

In other examples, instructions may control other features of presentation. For example, the instructions may indicate a playback bitrate of the final output. Such instructions may indicate that the bitrate of an output may be 128 kbit/s. Other instructions may specify other encoding parameters, etc. In addition, instructions may relate to the specifics of decoding various stems. For example, instructions may indicate the specific method to be used in decoding a stem. For example, instructions may indicate that one stem is encoded in MP3 format while another is encoded as a WAV file, and may, therefore, direct a rendering manager to decode the stems using the appropriate technique.

In example embodiments, the use of instructions may allow for the introduction of audio effects during playback. For instance, a series of instructions changing playback level over time may allow for a stem's content to be reproduced with a fade-in effect. In addition, instructions may be provided which may invoke special effects sequences during playback. For example, a content file may include a reverb instruction, invoking a procedure to introduce a reverb effect as to all or a portion of the content being played back. Such instruction sets may include alternative instructions to be used in the event that a particular rendering manager does not support one of the special instructions.

The discussion of instructions presented above is intended to convey the instruction set concept. It is not intended as a compete listing of the types of instructions supported. Indeed it is contemplated that example embodiments of the present invention may support all of the types of instructions useful in controlling the reproduction of media content.

An example content file in accordance with an example embodiment of the invention is illustrated in FIG. 1. FIG. 1 depicts a content file 100, which contains both a number of stems of audio content and several instruction sets. For instance, the content file 100 contains five individual stems 102-106. In the illustrated example, the stems are each shown to encode audio content produced from a distinct musical source, e.g., an instrument. Of course the stems need not be structured in the illustrated manner but may encode content using any possible organization. As explained above, the each stem may encode a portion of the content of a musical work, or an entire musical work. In the illustrated example, each stem records a portion of a musical work, for instance stem 1, 102, encodes a vocal portion of the work. As illustrated, the stems may encode more content then necessary for the playback of a single work. For example stem 5, 106, is shown encoding alternative vocals, which may replace the content of stem 1, 102, in some situations.

As explained above, content files may also contain instruction sets. In the illustrated example, the content file 100 contains two separate sets of instructions 107 and 108. As explained above, each instruction set, 107 and 108, may each contain instructions capable of directing the decoding and playback of the content stored in the file. Also as mentioned above, each instruction set may contain instructions serving a distinct purpose. For example, in the illustrated example it may be that instruction set 1, 107, is configured to play back an encoded musical work using the first four stems 102-105, while instruction set 2, 108, may be configured to playback a musical work constructed using the stem containing the alternative vocals 106. Of course the illustrated example depicts only one use for such instruction sets and content files may contain instruction sets for all of the purposes described herein. It is noted that the illustrated content file is provided by way of example only, and in no way limits the content or structure of such files. For instance, content files may contain any number of stems or instruction sets and may also contain additional material not illustrated.

Figure 2:
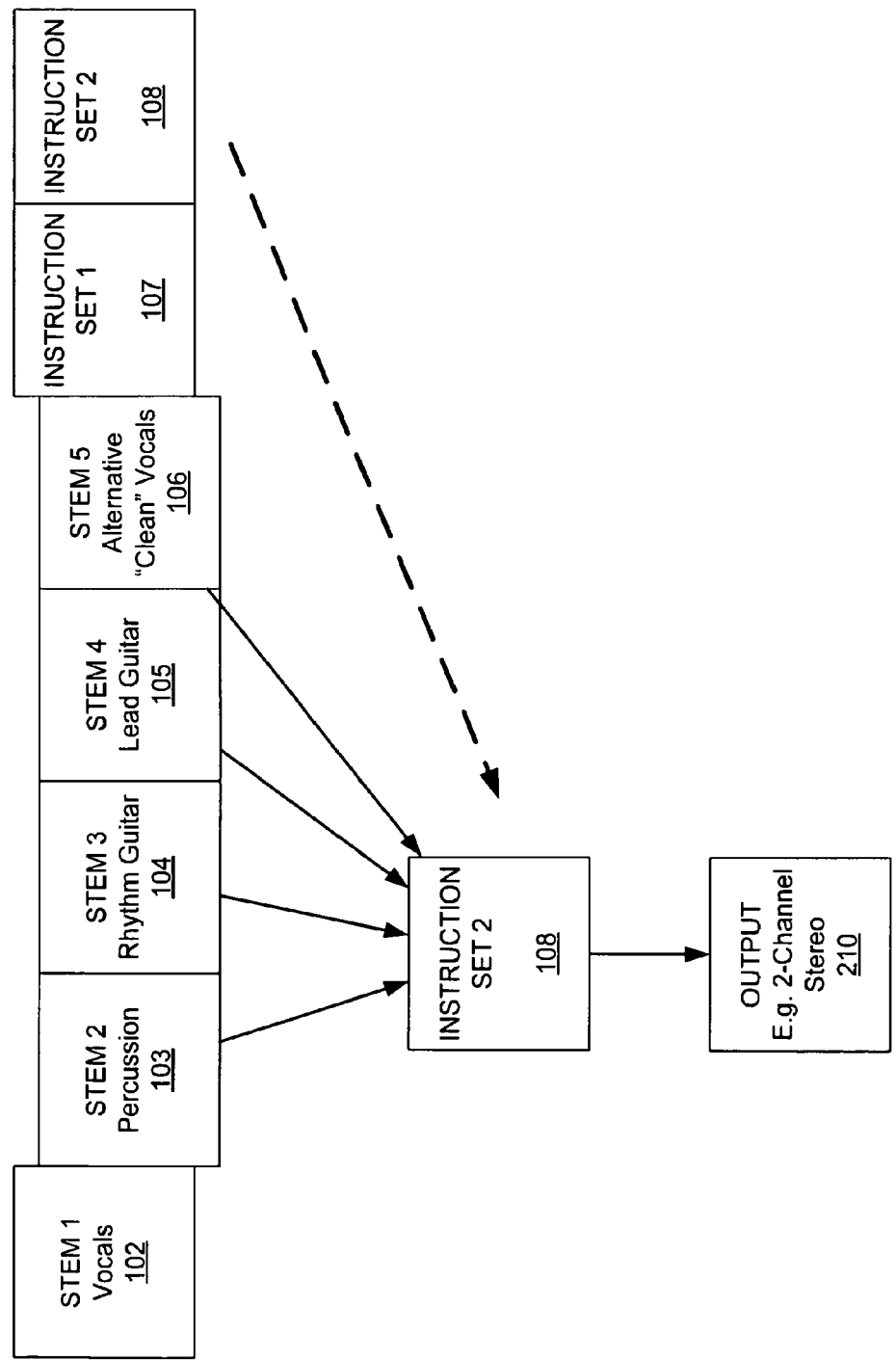
FIG. 2 illustrates a relationship between stems and instruction sets in an example content file in accordance with an example embodiment of the present invention.

FIG. 2 illustrates the relationship between stems and instruction sets in an example content file of the kind described above. For instance, the example content file 100 shown again illustrates five stems 102-107 and two instruction sets 107-108. As illustrated each instruction set may contain instructions which may direct the creation of an output 210. To do so, the instruction set may guide the decoding of content located in any number of the stems in the content file, or portions of those stems. For instance, in the example, one of the instruction sets 108 may be used to create an output 210 from four of the stems 103-106. In addition, the instruction set may contain all of the instructions needed to create the file output 210. For instance, in the illustrated example, the output is shown as being in 2-channel stereo format. Accordingly, the instruction set 108 may contain the instructions necessary to divide the decoded content from the stems into 2-channels and to format the content for stereo output. Again, FIG. 2 is provided for illustration only and is not intended to limit the possible uses of such instruction sets or content files generally. Rather, content files may contain instruction sets configured to direct any of the tasks useful in generating an output from encoded media content.

Of course instruction sets may be applied to any combination of stems in a content file, and there is no limitation on the number of stems as related to instruction sets. For example, a content file may include a number of stems, or just one stem, and multiple instruction sets that each use each of the stems in the content file. Another content file may again include a number of stems and multiple instruction sets, however, each instruction set may only use a discrete, non-overlapping, subset of the stems in the file; while in other files, instruction sets may use stems in any combination, with, e.g., some instruction sets partially overlapping with other instruction sets.

Other Data

In example embodiments, content files may include additional information or content. For example, content files may contain identifying information. For instance, each content file may contain a unique identifier. Such identifier may be assigned according to a standard, or may be based on the content of the file itself. For instance, a unique identifier may be created by applying a fingerprinting technique to one or more stems of the content file. Other identifying information may also be included, including the date of creation, name of the person who authored the file, the name of the organization that authored the file, etc.

In other example embodiments, content files may include metadata about the media encoded in the file. Thus a content file may include, for example, names of the artists which created the content encoded, or a name of a song. Any other descriptive information may also be included. Some examples may include information describing physical properties of content, e.g., duration, instruments used in the production of content, etc. Such descriptive data may be added to a content file at the time of creation, or may be added to a content file at a later time. For instance, consumers may create descriptive data and may include that data in a content file.

In example embodiments of the present invention, information encoded in a content file, for example describing a musical work, may be synchronized with the content. For example, metadata describing each of the artists performing a musical work may be included in a content file. That information may be synchronized with the musical content of the file. Such synchronization may allow a listener to receive context sensitive information during playback.

For example, in an example embodiment, a user may be able to press a button during a guitar solo and see or hear the name of the performer, performing the solo. If the listener were to press the button during a different segment of the work, however, the user might be provided with the artist or artists performing at that time. Any other metadata could also be included in a content file, synchronized to the content. Other examples may include information about the instruments used to play various portions of a work, information about the influences of a portion of a work, a narrative describing the creation of the work, or musical information, e.g., the key a portion of the work is performed in, etc.

In example embodiments, such metadata may be synchronized to particular stems and display of the information may be based on the particular stems being played back. For instance, a content file may include six stems including two stems containing vocals, which may be intended as alternatives, i.e., during playback one of the two vocal stems will be played at any given time. In such an example, metadata may be included and synchronized to each of the stems. If that metadata is accessed during playback, when the first vocal stem is being used, metadata for that stem may be displayed or otherwise utilized. If during playback the second stem is being used, however, information associated with the second stem may be accessed. For example, if in the example, the vocal portions are recorded by two different artists, metadata identifying each artist may be associated with the related stem and, therefore, during playback the correct artist may be displayed according to the stem being used.

Audio Information

In example embodiments, information may be included in audio form. For example, a content file encoding a song may include the name of the song in spoken form. For instance, the file might contain a recording of the artist's voice speaking the name of the song. Any other information which may be included in the content file may also be included in audio form, either alone or in addition to any other form in which the information may be represented, e.g., as text. Such information may be useful in a number of contexts. For example, in example embodiments a device may be provided which may allow users to access the content file without also providing a display screen. In such a case, metadata and other information may be delivered to users in audio form, without the need for a display. Numerous other applications are also contemplated, including devices for the visually impaired, etc.

In example embodiments, multiple versions of information may be included in audio form. For example, a recording of the name of a song being spoken may be recorded in multiple languages. Access to such information may be facilitated in any suitable manner. For instance, a standardized API (Applications Programming Interface) may be provided which may allow for access to the information. In addition, the information provided in such a manner may apply to an entire content file, or may be associated with particular stems, time segments, or other portions of the content file. As discussed more fully above, access to such information may be provided in a context sensitive manner.

Such audio recordings may themselves be protected by copyright law. As such, in example embodiments, as discussed more fully below, copyright information may be included in a content file identifying any copyrights which may pertain to the content or metadata elements encoded in the content file. Such copyright information may be associated with individual pieces of content or metadata or may be broadly associated with the content file in general.

User Created Data

In example embodiments, content files may be supplemented with metadata created by end users, in any possible form, e.g., as text, in an audible form, as a graphic or other "rich" digital media format, as a sheet music representation, etc. Such metadata itself may be stored within a monolithic content file, or separately, but, in any case, may contain enough information, including time synchronization, to allow it to be logically coupled to a specific content file, even when separate. Such metadata may allow or encourage users to contribute relevant information, such as annotations of a musical work. Such metadata may add significant value to commercial content, for example, by providing other consumers of the content with information of interest that was not encoded in the original content file.

The integrity of such information, however, may not be subject to verification by the originator of the content file, as the information may be created and circulated by consumers of the content file directly. Accordingly, the security and file integrity systems which may protect the content file generally, may not protect such user created content. Such systems, however, may passively allow user created content to exist. In addition, in example embodiments, users may be provided with tools to manage the specific content that they wish to associate with a particular content file. Such tools may allow for the creation, adoption, and dissemination of user created content.

Additional Music Information

Other example embodiments of the present invention may provide additional information related to the musical content of a content file. For example, a content file encoding a song may include sheet music for that song, e.g., in an embedded digital format, provided by the song's publisher. The sheet music may be provided for each instrument in the song or a selection of instruments. In addition, the sheet music may be associated with individual stems. If alternate stems are created, sheet music reflecting the content of those stems may also be included in the file. In other example embodiments, lyric sheets may be included in the content file in a similar fashion, as may any other additional musical information, e.g., guitar tablatures, etc.

Other descriptive material may be encoded in the content file as well. For example, a content file may include information describing the instruments recorded. Such information may be tied to a particular stem or stems. For instance, a content file may include information indicating one particular stem of the sound recording features a part played on a particular brand and model guitar. Such example information might discuss whether the artist in question has any particular history of using the instrument in question, or whether any other devices were used to modify the sound of the instrument. In some examples, the information included might include tips from the performing artist aiding consumers in playing the piece or in reproducing the sound.

Other musical information that may be included in the content file might include a discussion of the creation of the sound recording. For instance, the information could include an interview with the artist discussing how the song in question developed. The file could also include a listing of influences which the artist or artist sees as having inspired parts of the work. As above, such information could relate to the work as a whole, or could be associated with a particular stem or other portion of the content.

Copyright Information

Example embodiments of the present invention also may permit copyright information to be encoded within content files on a granular level. For instance, in the case of a content file that encodes a single song, copyright information may be included which may include the date of the recording, the artist, contact information, etc. Example embodiments of the present invention, however, may provide for granular association of copyright information with content as well. For example, the single song discussed above may include a short portion "sampled" from another work. In such a case, the content file may include copyright information related to that sampled portion as well as copyright information pertaining to the song as a whole. For example, in addition to typical copyright information, such as date of creation, the content file might include information identifying what stem or stems the copyrighted material appears in, and the portion of each stem that contains the material, e.g., information stating that a certain party holds a copyright in three seconds of the content of each stem in the current file which begins at some time.

Figure 3:
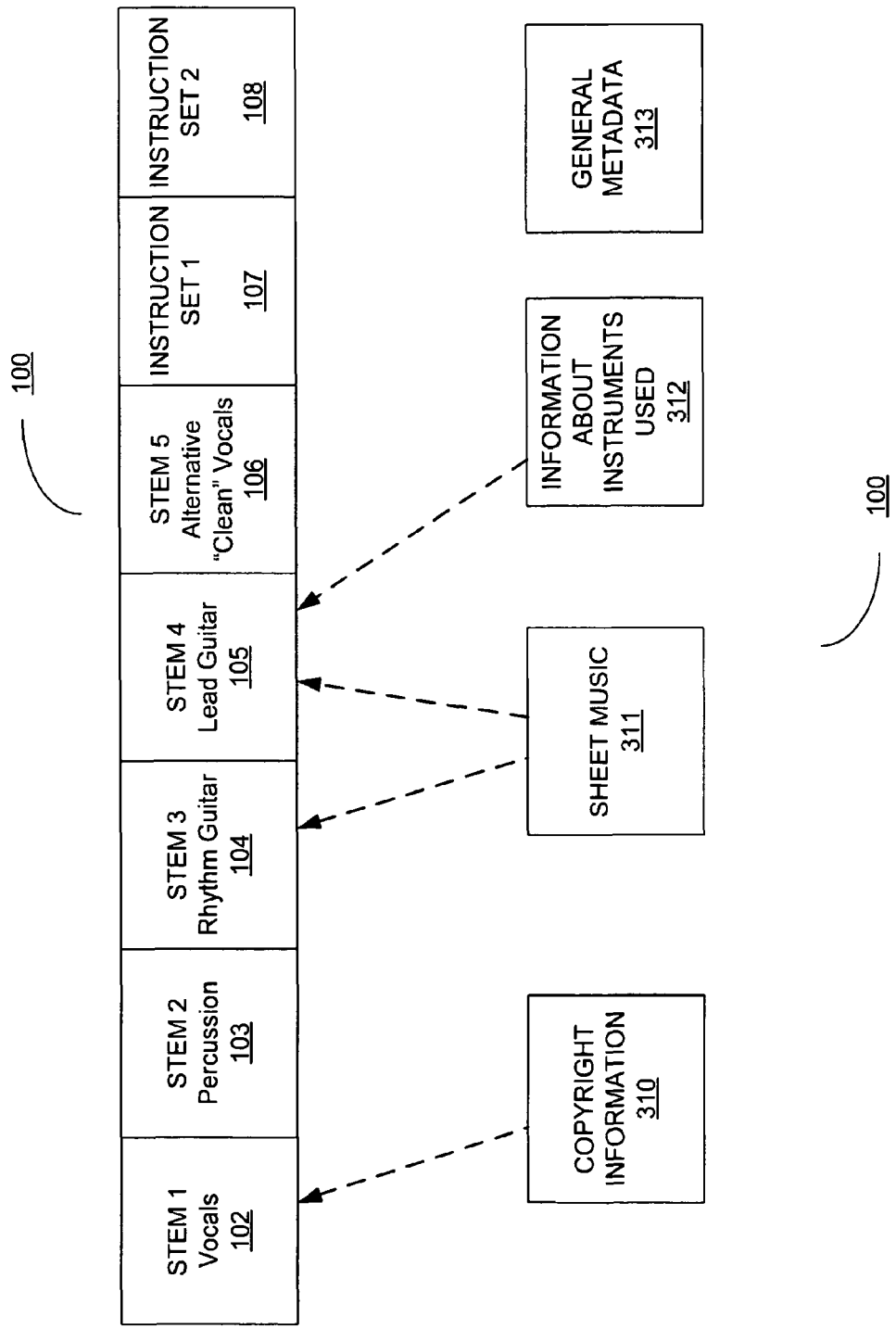
FIG. 3 illustrates another example content file in accordance with an example embodiment of the present invention.
Figure 4:
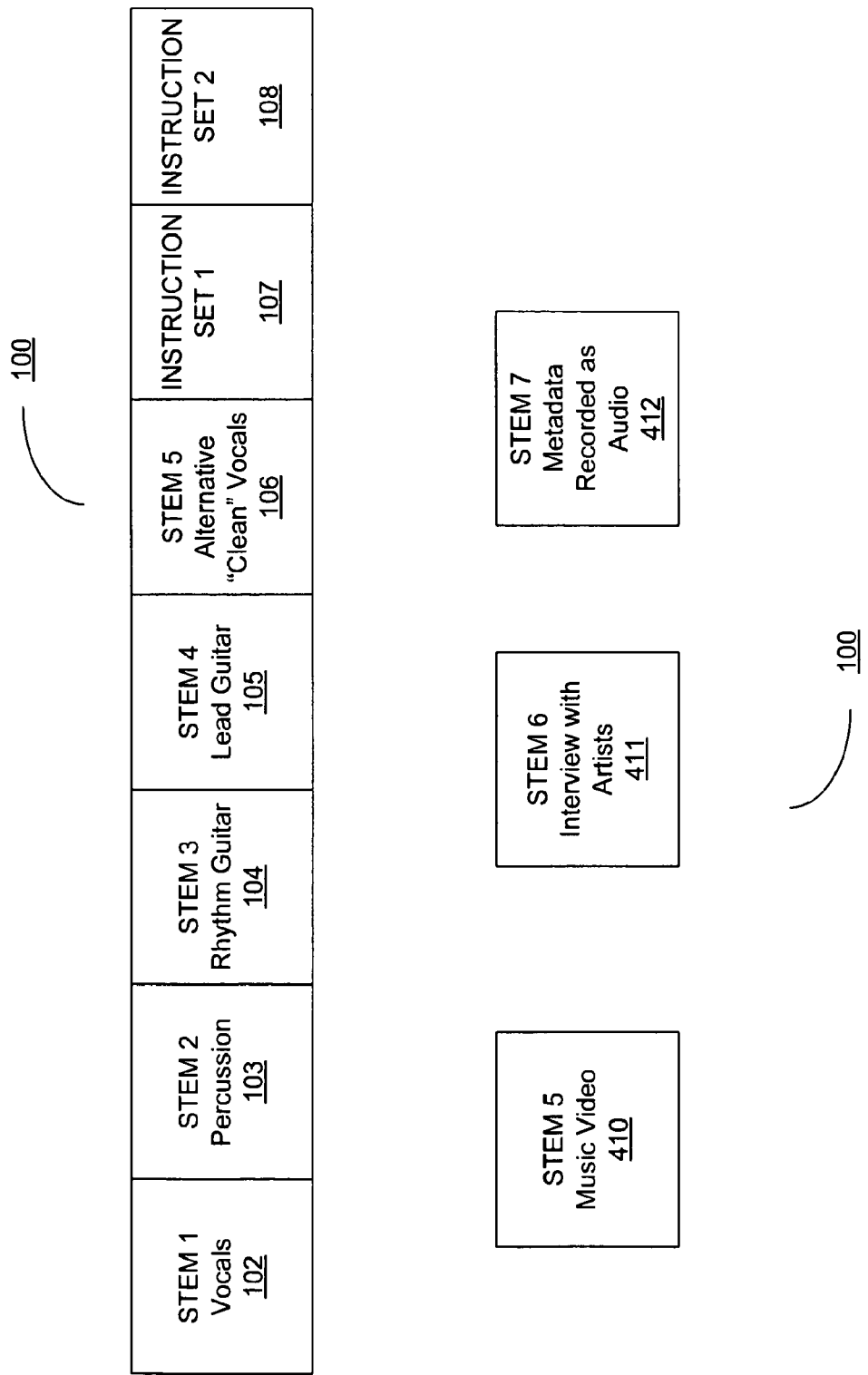
FIG. 4 illustrates another example content file in accordance with an example embodiment of the present invention.

By way of example, FIGS. 3 and 4 illustrate example content files containing additional content and information as described above. FIG. 3, for example, illustrates an example content file 100 containing four pieces of additional information 310-313 beyond the stems 102-106 and instruction sets 107-108 included in the file. For example, the example file 100 is illustrated as including copyright information 310 and sheet music 311. Of course, content files may contain any of the kinds of additional information discussed and may or may not contain the illustrated materials. As illustrated, such additional elements may be associated with one or more portions of a content file or with the content file as a whole. For instance, in the example, material, such as the copyright information shown 310, may be associated with a particular stem or portion of a stem. Other material, such as the sheet music shown 311, may be associated with multiple stems or portions of stems, while other material, e.g., the general metadata 313, may be associated with the content file 100 as a whole. Any possible associations may be created.

As explained, such content files may contain additional media content as well as metadata and information. FIG. 4 illustrates an example content file 100, containing additional media content. For instance, the file in FIG. 4 is illustrated as containing three stems of additional media content 410-412. Such content may be accessed using instruction sets in a similar manner to the content of other stems.

Content Discovery

In example embodiments of the present invention, all of the types of additional information discussed may be used to enable content discovery applications and systems. For example, in example embodiments of the present invention, content files may be used to construct databases storing information about the content stored in those files. The information stored in such databases may be automatically generated based on the information stored in content files, or may be generated in another fashion. For example, in some example embodiments of the present invention, information may be gathered from content files to create a database of information which may allow users to browse the properties of content reflected in the database. Such information may include any of the types of information that may be included in content files. For instance, an example database may gather information from a content file indicating the genre of content stored in a file, the instruments on which the content was played, the formats the content supports (e.g. 6-channel surround sound format), etc. In addition, the use of such information is not limited to information associated with a content file as a whole but may include information associated with only a portion of a content file. For instance, a content file may contain stems and instructions necessary to render both a studio and a live version of a song. The content file may also contain information as to the artists performing each version of the song, which need not be the same between the two songs, e.g., an additional artist may appear in the live version. Both sets of information may be used in some example systems. Further, the information gathered may be included with the original content file or may be created by third parties after the creation of the original content file.

Example embodiments of the present invention may allow consumers and others to explore the properties of content using the information. For example, users may be able to search a database for a desired property, e.g., artist name. Other example systems may provide an associative search facility, allowing users to select known content and generating a list of other content related to the selected content in some way. In example systems interfaces may be provided allowing users to access the gathered information. For instance, users may be capable of accessing the information using a web browser. In other embodiments, users may be able to access the information using example rendering managers, discussed more fully below. Such systems may allow users to identify content in which they are interested and may provide them with opportunities to obtain licenses in such content.

Dynamic Content

Once a content file is created it need not be static over time. In example embodiments of the present invention, a content file may be updated with additional stems, instructions, and other elements even after the file has been distributed to a customer. For example, suppose that a customer purchases some rights to a song and as a result receives a content file containing both the stems and instructions to reproduce that song. Sometime later it may be that a live version of the same song is recorded. In some embodiments, the content file may be automatically updated with the stems, instructions, and other information that enable playback of the live version. As explained more fully below, updating the file does not necessarily mean that the user is given rights to the new version at that time. The updated file, however, contains the information necessary to playback the live version if the user is or becomes authorized to play it.

Content files may be updated in multiple ways. For example, in some embodiments the rendering manager which stores the content file may be connected to the Internet. The rendering manager may, therefore, be capable of communicating with various provider devices to identify and receive updates. Such updates may occur automatically, or may require user interaction. In particular, some updates may require a user to pay for or otherwise obtain rights to the new content before the file is updated. Alternatively, new content may be broadcast over radio or satellite, or may be distributed on fixed media such as CDs, DVDs, and magnetic media. Such new content may be incorporated into the file permanently, e.g., in the case of a download, or may be associated with it on a temporary basis, e.g., in the case of streaming content.

Extended Features

In example embodiments, content files like the ones described above may be used to provide users new ways of consuming content. Examples of the types of new features which may be provided to consumers through the use of the content files described above are provided below.

Alternative/"Edited" Vocals

For example, in example embodiments content files may be created which may encode multiple stems, each including vocal portions of a song. For example, a first stem may encode the original vocals for a song, while a second stem may encode another set of vocals with an "edited" version of the lyrics. It is noted that the individual stems need not each extend for the entire time of a work. For instance, a song may be encoded in seven stems, including one vocal stem. In addition, the file may include an eighth stem which may encode a small portion of vocals which may be substituted into the main vocal stem in order to playback an "edited" version of the song. The content of that stem, however, may not need to repeat all of the information already contained in the main vocal stem, but may simply include the minimal audio information required to replace the portions of the main vocal stem that are not to be played back during the "edited" version. Such a content file may, therefore, include two sets of instructions. A first set of instructions may instruct a rendering manager to playback the song using the primary vocal stem alone. The second set of instructions however, may cause a rendering manager to playback the song using the primary vocal stem, but may also include instructions to stop playback of that stem, substituting content from the "edited" stem at certain times.

In other examples, an "edited" version of a song may be produced without additional recorded content. For instance, instructions may be provided which may simply stop playback of the original vocal stem during a time period when potentially offensive lyrics would normally be played back. Alternatively, instructions may be included instructing a rendering manager to produce a particular sound in place of the vocal stem's content, identified, e.g., by frequency and duration. In such a way, one content file may be able to encode both an "explicit" and an "edited" version of a work, and may do so without significantly increasing the quantity of information encoded.

Music Minus One—Karaoke

Other example embodiments may allow musicians to play along with a sound recording. For example, embodiments of the present invention may provide users with the ability to playback a sound recording without playing back one piece of the recording. Thus a user who plays the piano may be able to play a popular song without the keyboard instruments that may be part of the song. During playback, the user may then be able to play along with the recorded work without interfering with the part that was actually recorded. If the recorded feature that the user chooses to silence is a vocal portion of a work, the user would be able to perform a karaoke version of the work.

In addition, in some example embodiments, the user of such a feature may be able to record the user created portion. The user created recording may be encoded as a stem and stored within the content file, similar to the manner in which other portions of the audio are recorded. The user then may be able to choose to playback either the original version of the sound recording, or may also choose to playback a version of the sound recording including the user played instrument in place of the original instrument.

Some example embodiments of the present invention may also allow users to share custom created stems like those above. In some embodiments, users may be able to share content over the Internet, or through any other practical means. It is noted that users exchanging stems in this manner need only exchange the custom made stem and not the entire sound recording, which would normally be the case. For example, assume that a user plays and records a stem encoding the user's version of the keyboard portion of a song. Should that user desire to share the custom recorded version of the song in, the user need not send the entire song. Rather, the user is able to send only the new stem, possibly along with instructions as to how to playback the custom version of the song. Such embodiments provide significant advantages. For example, the user may not violate copyright laws by sharing the custom version of the song as the original recorded content is not transmitted by the user. Instead the receiving user may receive only the user's own recorded content. In order to listen to the entire recording, the user may need to already be in possession of the original content file and have appropriate rights as to that file. In addition, because only the custom recorded portion of the recording needs to be transmitted, sharing and storage of that custom recording may require fewer resources.

Other features may be provided in such examples. For example, during such a session, a user may be provided with sheet music encoded in the file. Such sheet music may have a moving place marker pointing to the notes which should currently be playing. In addition, example embodiments of the present invention may provide for an analysis/learning feature to compare the user created audio with the originally recorded audio, possibly pointing out inconsistencies between the two.

Rights Management

Example embodiments of the present invention may also provide flexible rights management features. For example, embodiments of the present invention may greatly extend the capabilities of rights management systems by applying rights management techniques to stems and other portions of content files rather than simply applying rights management to files in their entirety.

In some examples, rights management support may be built into rendering managers and may include a rights management system. The rights management system may maintain a database, which may include a record for each right that a user may have in particular content. In example embodiments, such rights may be applied to any of the elements of a content file as described above. For example, a user may have a right to one or more particular stems encoded in a content file. As an example, a user may have access to all of the stems of a particular audio recording as originally released; however, the user may not have access to a newly released stem which encodes alternate vocals for a particular song. In addition, rights may be applied to an instruction or set of instructions included in a content file. For example, a user may have a right to access the instructions which instruct a rendering manager to playback a recording in 2-channel stereo format but may not have access to the instructions which control playback in Dolby 5.1 format. In addition, rights may be applied to other features which may be included in the content file. For instance, a user may have the rights to play back a song, but may not have access to view or print the sheet music for that song, or may not have access to play the song in a karaoke version which eliminates one or more stems encoding vocal portions of the song.

Figure 5:
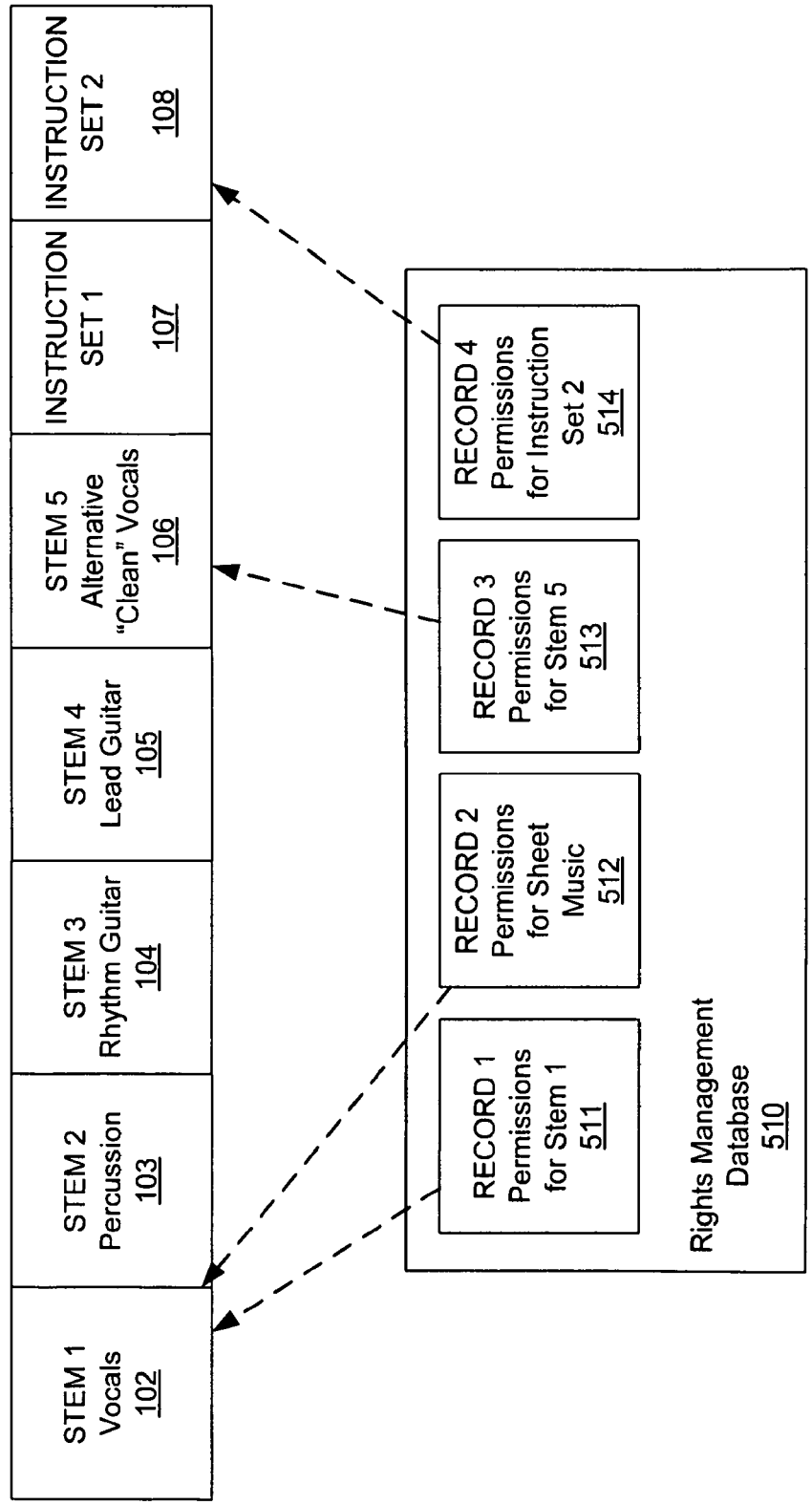
FIG. 5 illustrates an example rights management database in accordance with an example embodiment of the present invention.

As an example, FIG. 5 illustrates an example rights management database 510. As discussed above, the example depicts rights management records 511-514 which, in this example, are each associated with a particular portion of a content file 100. Although illustrated in this manner in the example, it is to be understood that the association between rights management records and content files need not be so structured, e.g., a rights management record might relate to a file as a whole, or to multiple files or portions of files, or might relate to several portions of a content file, etc. As illustrated in the example, rights management records may relate to any of the portions of a content file and are not limited to primary content. For example, record 3, 513, is illustrated as setting permissions for one stem 106 of the content file, while record 4, 514, is illustrated as setting permissions for an instruction set 108. As the example also illustrates permission may be set for additional content included in a content file, for instance record 2, 512, is depicted as setting permissions for access to the sheet music associated with a stem, note that such permissions may be set distinctly from the permissions of the stem itself 511. Again FIG. 5 is provided for illustrative purposes only, and is not intended to be limiting. Example embodiments of the present invention may provide for any feasible rights management structure, and may support any types of associations between content files or portions of content files and rights management records.

In order provide granular rights management, each portion of the content file may be separately referenced. For example, a content file may contain one or more individual identifiers for each stem and each instruction set contained in the file. In some examples, identifiers may be included for smaller portions of the content file, for instance, individual instructions within an instruction set, or portions of a stem. Accordingly, permissions to a content file may be granted on a portion-by-portion basis. Of course, reference to portions of the content file need not be facilitated by the inclusion of identifiers, and any acceptable reference technique may be employed. For example, portions of a content file may be referenced based on their location within the content file.

In addition, permissions are not limited to the ability to control simple access to portions of a content file. Rather, the rights management system may control the ability to alter portions of a content file, and also the ability to introduce new stems and instructions into the content file. For instance, a rights management database may allow a user to create and save new instruction sets and stems, or to modify existing instruction sets and stems. In addition, rights management systems may control the ability to directly access portions of a content file. For instance, a user may not be granted the right to playback a particular stem. However, the user may have the ability to execute an instruction set which may in turn playback the stem. Thus, a user may not have raw access to the content but may be able to access the content in the form specified by the instruction set. Similarly, the rights management system may allow a user to execute an instruction set which plays back a particular stem but may not allow the user to create a new instruction set accessing that same stem.

In other examples, the rights management system may permit access to a particular content file or element of a content file for "Preview use only." Under such a right, content may be rendered for "preview" purposes, to allow a listener to "try before buying;" restrictions may include reduced fidelity audio (such as monophonic, low-resolution) playback, playback up to a maximum number of times, playback until a given time or date, etc. In other example, the rights management system may provide an "Owned with unlimited use" right, which may place no restrictions on the rendering of the content. In other examples, the rights management system may include a "Valid for subscription" right. A piece of content available under such a right may be usable as long as valid membership in a listeners' subscription program is maintained. In example embodiments, a digital token or "license" which confirms membership in the program may be stored elsewhere in the rights management database. In other examples, a "Default stereo use only" right may be provided; which may grant a permanent ability to render 2-channel stereo audio, but no rights to use the advanced features provided for in example embodiments of the present invention. Another right that may be provided for is an "Airplane playback" right, which may grant a limited ability to render content for which permanent rights are unknown, e.g. due to lack of Internet connectivity, such as when a user is airborne, or in some other unconnected environment. It is to be understood that the rights described above are by no means limiting, but are provided to illustrate the rights management features of example embodiments of the present invention. Example embodiments may provide for any number of rights, and may also provide for extensible rights definitions. In that manner, as new business and marketing models arise, rights definitions may be easily modified to support those models.

Rights management information may be contained in content files or may be external to content files or both. For instance, a content file may be created which may include an initial set of permissions. Thus, the content file may contain information which may be copied into a rights management database upon receipt of the content file. Such an initial set of permissions might, for instance, define a minimum level of access to the content which might be suitable for promotional purposes, for instance, access to a portion of an encoded musical work, or to an instruction set which plays back a reduced quality version of a musical work. Of course content files need not contain permission information themselves. Rather, a rights management system may be relied on to obtain the necessary permissions from a source other than the content file itself.

In example embodiments, then, users may obtain a content file which may contain more content than they are currently permitted to access. In this way, distributors of music or other content need only maintain a single version of a content file, which may be distributed to all consumers. Access to the file may, however, be controlled on a case-by-case basis using a rights management system. It is also noted that encryption techniques and other security techniques, e.g., watermarking, digital signatures, etc., may be used to secure content files, elements of content files, and rights management information, in any of the ways such techniques are typically employed.

In example embodiments of the present invention, a rights management system may be provided for in hardware built into a rendering manager. For example, in example embodiments, a rendering manager may be provided with a database containing rights management information. For example the rights management database may be stored in non-volatile memory, such as, e.g., Flash RAM. The storage medium may be directly connected to the rendering manager. Indeed, in some example embodiments the storage media containing the rights management database and the rendering manager itself may be built on a single integrated circuit chip. Rendering managers constructed in such a manner may provide enhanced security, as the database may be closely linked to the rendering manager itself. In order for the rendering manager to decode a sound recording at all, it must first access the rights management database. Close integration of the rights database and the rendering manager helps ensure that the rights management database is difficult to modify by any system other than the rendering manager itself. In addition, in example embodiments, the rights management database may be stored in an encrypted form. In this way, additional security may be introduced, helping to ensure that sound recordings distributed using the disclosed systems and methods may only be accessed by legitimate consumers.

In addition, example embodiments of the present invention may provide for the transfer of rights management databases between two different rendering managers. Such a transfer may be either permanent or temporary. In example embodiments, such transfers may allow users to upgrade to a new device, including a new rendering manager without loss of rights. In addition, temporary transfers may permit users to temporarily access content to which they have gained access rights on other rendering managers. For example, rights stored on a rendering manager used in a home, may be temporally transferred to a rendering manager included in an automobile playback system.

Rendering Manager

Embodiments of the present invention may provide systems which may include a rendering manager. A rendering manager may be a system capable of decoding the content files discussed above, rendering the files, and providing all of the features discussed. In example embodiments, a rendering manager may be implemented in hardware, or software, or both. In addition, rendering managers may be implemented with varying features depending on the particular embodiment. For example, a rendering manager implementation built into a portable music player may include one set of features while a rendering manager implemented for a personal computer may include another set of features.

In example embodiments of the present invention, rendering managers may be capable of receiving content files. Such rendering managers may receive content files from, for example, a local storage device or memory, a remote storage system, another rendering manager, etc. Example rendering managers may also be capable of processing such content files. For instance, a rendering manager may be instructed to produce an output from a particular content file. To do so the rendering manager may be capable of reading an instruction set, of the kind described herein, contained in the content file or another content file. The rendering manager may be capable of executing the instructions contained in the instruction set. Directed by those instructions, the example rendering manager may be capable of decoding stems, or portions of stems, included in the content file. Also directed by the instructions, the example rendering manager may be capable of assembling the decoded content into an output format, for instance, a 2-channel stereo format, or a 6-channel digital format, and may be capable of outputting the decoded content in the desired format.

In example embodiments, rendering managers may be required to conform to a standard specification. Rendering managers conforming to such a specification must be capable of handling a basic set of the features present in a content file, as described above. For instance, a conforming rendering manager may be required to be capable of interpreting a number of instructions. Notably, a complying rendering manager may be required to process those instructions in a specific manner, in order to present a consistent output. In addition, conforming rendering mangers may also be required to recognize and process certain default instruction sets. By providing a specification to which rendering managers must conform, which may include both requirements for the handling of various instructions and for the treatment of default instructions sets, conforming rendering managers may be guaranteed to playback content in a consistent way. For instance, standards compliant rendering managers would allow the flexible content files described above to be used for the distribution of a "studio" version of a musical work.

For example, in the case of a musical work, the artist may wish to achieve a particular sound when recording and producing the work. As such, the artist may be involved in the creation of a set of instructions designed to playback the stems of the recorded work. Fine tuning the instruction set may allow the artist to achieve exactly the intended sound. However, unless the devices which will interpret those instructions and playback the sound recording are made to comply with some standard, there can be no guarantee that the work is reproduced with the intended sound on those devices. By requiring rendering managers to comply with a standard specification as described above, however, it may be possible to ensure that content is played back by those rendering managers in the intended manner.

In example embodiments a rendering manager may be provided as a hardware device. In such embodiments, a rendering manager may be constructed as a single circuit chip. In other embodiments, the rendering manager may be constructed from multiple components. Such rendering managers may be constructed as part of a larger system. For instance, an example rendering manager may be built in hardware as part of a portable personal media player, or a home entertainment system, or a car audio system, etc. In such examples, interface controls may be provided, allowing users to access the features of both the rendering manager and the larger system. For instance, a portable music player may include a rendering manager which may be capable of playing back content files. Such a player may also include a volume control to set the level at which a recording is played and may also include controls allowing a user to select a set of instructions for controlling playback of the content, from several sets of instructions encoded in a content file. Such controls may be distinct from the controls typically provided with such a device or they may be integrated with those controls. For example, a content file which encodes a song may be stored on an example player. The content file may include instructions for playing back the encoded content in both an original form and in a form including "edited" lyrics. The player may include special controls for allowing a user to choose between such versions, or may integrate those controls into the controls typically found on such a media player. For instance, the player may represent the two playback versions as distinct songs in a list of songs which the user may choose between.

As explained above, in example embodiments, a rendering manager may include a rights management database which may contain records of a user's or system's rights in various content files. Also as explained above, in example embodiments, the rights management database may be closely bound with the rendering manager. For example, the rights management database may be contained on a memory chip connected to the rendering manager. In example embodiments the rendering manager and the rights management database may be formed on a single circuit chip. In such embodiments the rendering manager may be tightly bound to the rights management database. Therefore, it may be difficult for persons in possession of a rendering manager to alter the rights management database and to gain unauthorized access to content files or portions of content files. Example rendering managers may also allow the rights database to be updated. For example, a rendering manager may be capable of receiving input from a supplier's server indicating that a new right should be added to the database, or that a right should be deleted or modified. Such updates may occur at the request of a user or may be initiated remotely.

To facilitate communications, example rendering managers may be equipped with a communications interface. For example, a rendering manager may be capable of communicating with other devices over the Internet, over other networks, or directly. Such a communication interface may be designed to encrypt communications which use the interface in order to provide a secure form of communication. Such an interface may be used for any of the communications needs of a rendering manager. For example, rights management information may be transmitted to and from the rendering manager, usage data may be gathered from the rendering manager, new and updated content may be transferred to the rendering manager, content and other information may be shared with other rendering managers, etc.

Example rendering managers may also be capable of identifying content. In some examples, this may mean extracting one or more unique identifiers from a content file. In other examples, however, in the case of content files without unique identifiers, a rendering manager may be capable of creating unique identifiers of its own. For example, a rendering manager processing a content file containing the stems of a song, may employ a fingerprinting algorithm to generate a unique identifier for the file, the stems of the file, or any combination of elements. The identifier may then be, e.g., stored in the file, used to identify the content in connection with the rights management system, and for other purposes. For instance, the identifier may be reported to a service provider server in order to identify illegally obtained content.

Example rendering managers may also include a secure clock. For example, if a rendering manager is constructed in hardware on a single chip, the chip may also include the circuitry to implement a clock. In other embodiments, a clock may be provided in any tamper resistant form. Such a clock may be used in example embodiments to facilitate the rights management activities of the rendering manager. For example, to identify expiration of a subscription based right, or to make available a "bonus" feature after the expiration of a certain time period.

In example embodiments, rendering managers may provide a number of advanced features. For example, example rendering managers may be provided which may be capable of providing playback at varying bitrates while using only a single content file as a source. For example, each of the stems in a particular content file may be encoded at 320 kbit/s. A rendering manager, however, may be able to support other bitrates, e.g., 192 kbit/s or 96 kbit/s, as long as those bitrates are lower than the maximum encoded bitrate of the stems themselves. Thus the rendering manager may be able to use one content file to supply audio for various applications. For instance, the audio output of a rendering manager in one instance may be streamed across a network, which may require a lower bitrate in order to function properly with the network resources available, while the same rendering manager my output a high bitrate when feeding into a high-end sound system.

In other example embodiments, the rendering manager may also include an input facility. For example, a rendering manager may allow consumers to record their own stems, e.g., as suggested above in connection with the karaoke feature. In example embodiments, rendering managers may be tied to physical hardware which may allow for the input of sound data, for example from a microphone. Example rendering managers may encode such inputted data into a form which may be included in a content file, for example as a new stem. In addition, example rendering managers may encode all of the information needed to associate an input with a particular content file. For instance, the rendering manager may encode timing information along with the sound data such that the new sound recording may be played back along preexisting content in a content file, while maintaining time synchronization with the content file. Data so input need not be limited to sound data. For instance, other rendering managers may allow for the input of both audio and video data. Using such a feature, for example, a user might be able to record a video of the user performing along with audio played from a content file. Such example rendering managers may also automatically create an instruction set allowing for playback of the newly created performance. Such instructions may be edited by the user in some examples, and may be stored in a content file.

Example rendering managers may also allow users to create and associate metadata and other descriptive data with the content they input. For instance, a rendering manager may provide an interface which may allow a user to input text or audio describing user recorded content. Example rendering mangers may allow users to associate such data with an entire piece of user recorded content or with portions of the content.

Example rendering managers may also be configured to playback a content file based on environmental factors. For instance, an example rendering manager may have an associated version number. The version number may indicate the version of the rendering manager itself and may allow the rendering manager to make choices about the playback of particular content files. For instance, playback of a content file may be requested, which may contain different instruction sets for playback based on the version of the rendering manager. A rendering manager may be capable of comparing its version number to a version number encoded in the content file and applying the appropriate instruction set. In this way, content may be played back appropriately regardless of the version of the rendering manager used. Such a feature may be important, for instance, if newer versions of a rendering manager are provided with an extended instruction set.

Example rendering managers may be provided which may consider other environmental factors when presenting a content file. For instance, example rendering managers may have access to the physical characteristics of the hardware being used for output. In such a case, an example rendering manager may use that information to select an instruction set to use for presentation of a content file. For instance, a rendering manager may know that playback will be on a system which supports 6-channel audio. Therefore, the rendering manager may choose an instruction set from a content file which is intended to create 6-channel audio when executed.

Other example rendering managers may be capable of adjusting the instructions included in an instruction set based on environmental considerations. For example, an example rendering manager may be built into a portable music device which is designed to rendering music on headphones. Based on the sound production characteristics of those headphones, the rendering manager may be capable of introducing instructions which adjust the levels of certain sonic frequencies. In some examples, such a rendering manager may first identify whether a specialized instruction set is included in a content file, designed to compensate for the particular environmental factor under consideration. If such an instruction set exists, the rendering manager may simply use that instruction set. If, however, no such instruction set exists, the rendering manager may modify the instructions of another instruction set in order to compensate for the environmental characteristics. Such environmental characteristics may be permanently encoded in a rendering manager, or may be user adjustable, or may be inherited from other systems to which a rendering manager is attached.

In some example embodiments, a rendering manager may gather and securely record dynamic data during use. For example, an example rendering manager may store statistics such as the number of times content is accessed, the last date and time that particular content was accessed, the manner in which the content of a content file was most recently accessed, e.g., the particular instruction set used, etc. Such information may be gathered about any element of a content file or a content file generally. In example embodiments, the information gathered may be made available to the rights management system of the rendering manager, allowing rights management activity to be based on the information gathered. For example, a user may have a right to playback a song five times. Accordingly, before playback the rendering manager may determine the number of times the song has been played. In other examples, a rendering manager may be in communication with other devices, including service provider servers, user devices, and other rendering managers, and may exchange the gathered information with those devices, e.g., in order to allow a service provider to determine the popularity of a song.

Example rendering managers may also provide a user interface allowing users to access features made available by such a rendering manager. For instance, such an example interface may provide access to metadata and other information contained in the file. Such an interface may be in the form of a graphical display, or may be an audio based interface making use of data encoded audio form, or may be implemented as an API allowing for flexible access to the features of the rendering manager by external applications and devices. Example rendering managers may allow users to access the features of each content file. For instance, a rendering manager may allow users to view sheet music associated with a stem, and may allow the user to select between the various pieces of sheet music encoded in a content file. Such an interface may also provide users with the means to manipulate information encoded in content files. For instance, an example interface may allow users to display a piece of sheet music encoded in a content file using the user's clef of choice. Example interfaces may also allow users to select from the various extended features provided in a content file. For instance, an interface may allow a user to see a list of features supported by a content file, one of which may be a music-minus-one feature, selection of which may allow a user to render the content of the file without a particular portion of the original content as discussed above.

In addition, an example interface may permit a user to receive rights to various features and content included in a content file. For example, the interface may present users with all of the features encoded in a content file, and may indicate those features to which the user currently has access. For example, a content file may include stems and instructions to play both a studio and a live version of a song. In such a case a user may only have access to the studio version. An example interface, however, may allow a user to obtain access rights to the live version. For instance, the user may be allowed to request access to the live version, at which time an example rendering manager may connect to a remote server to negotiate additional rights. The interface may allow users to obtain rights in any useful manner, for instance may present a user with the option to pay a fee for additional rights. Of course, in example embodiments, users may obtain rights without using an interface provided by a rendering manager, for instance by accessing a webpage.

In other example embodiments, a rendering manager may be configured with "profiles." Such profiles may define a set of available functionality provided by the rendering manager using that profile. Using such profiles, a rendering manager may provide appropriate features based on usage context. For instance, a "general" profile may provide access to the entire feature set of the rendering manager, while an "automobile" profile may provide a reduced feature set denying access to those features which might cause a safety hazard in the automobile context. Other profiles may be supported for other contexts.

Example rendering managers may, in fact, be capable of supporting any of the features facilitated by the content files discussed. Example rendering managers may be provided in any physical form possible. For example, some rendering managers may be provided on an integrated circuit chip, which may be built into a consumer audio device. Other rendering managers may be constructed in hardware as stand alone appliances, while others may be implemented entirely in software or as a combination of hardware and software.

Figure 6:
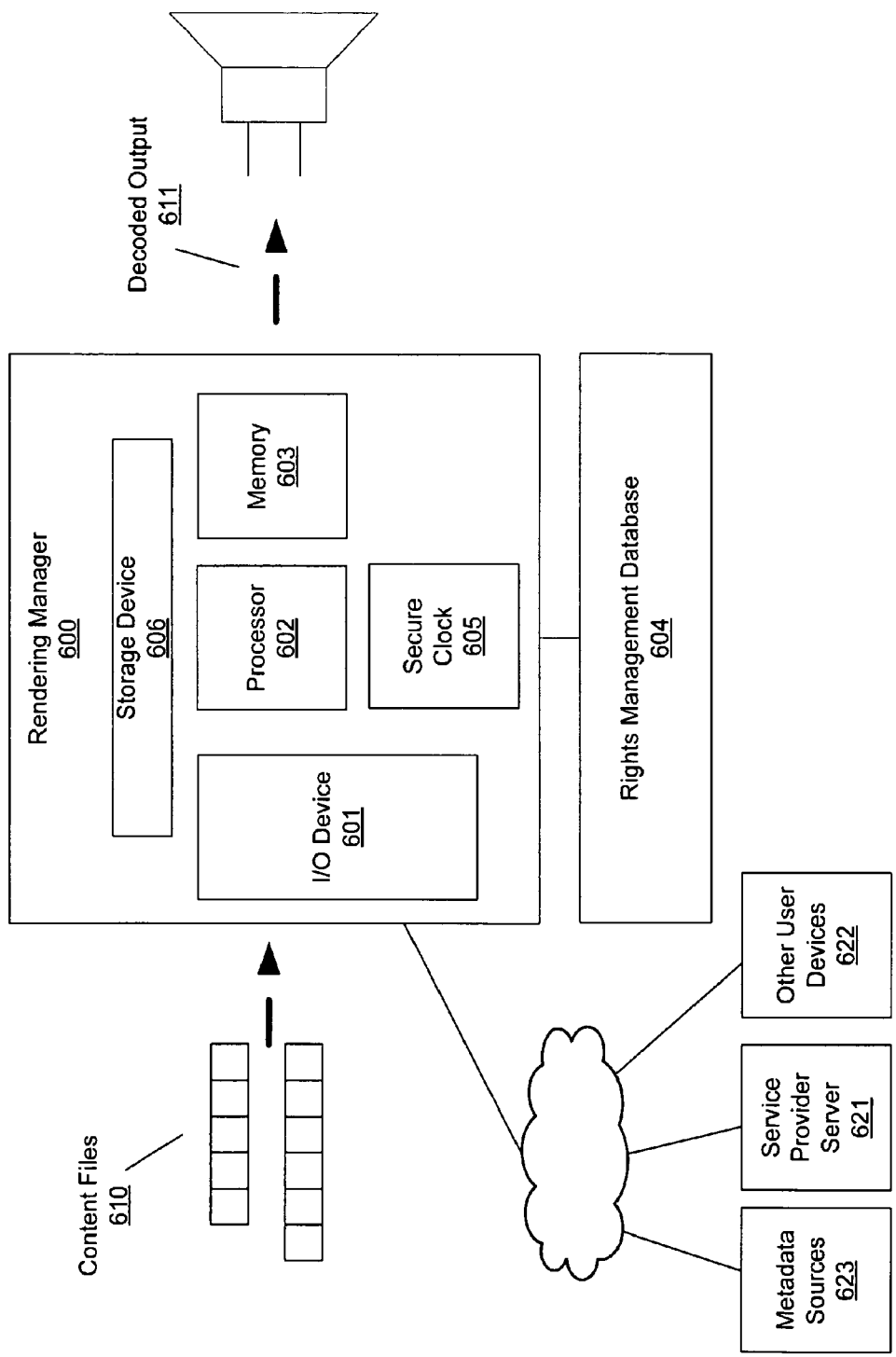
FIG. 6 illustrates an example rendering manager in accordance with an example embodiment of the present invention.

By way of example, FIG. 6 illustrates an example rendering manager 600 in accordance with an example embodiment of the present invention. In this example, the example rendering manager may be implemented in hardware, as either a single component or a collection of components. For instance, the illustrated rendering manager 600 may include a processor 602, which may be capable of carrying out the functions of a rendering manager as described herein. For example, the example processor 602 may be configured to execute instruction sets, decode stems, and assemble stems into a format for output. The example rendering manager may also include one or more input/output devices 601 capable of receiving input from other systems or components. Such I/O devices may include any device suitable for communication including, for example, communications busses, networking interfaces, other devices such as audio devices, etc. Such I/O devices 601 may be configured to allow communication with other systems and components, for example storage systems, user interfaces, memory systems, etc. In the illustrated example, for instance, the depicted rendering manager is able to communicate with other systems including, e.g., service provider systems 621, other user systems including other rendering managers 622, and metadata sources 623.

The example rendering manager depicted may be capable of receiving a content file 610. Such a content file may be received from any possible source. For example, content files may be received from local or remote storage or memory systems, or may be received over a network, for example, as streamed content. Once received, the example rendering manager 600 may be capable of processing a content file as described herein. The example rendering manager may also be capable of outputting decoded content 611. For example, an example rendering manager may be capable of outputting a 2-channel stereo audio signal to a system capable of reproducing that audio.

In the depicted example, the example rendering manager may be connected to a rights management database. As explained above such a database may be constructed in any reasonable way; for instance, the database may be stored in Flash RAM, on magnetic or optical media, etc. In example embodiments, the database may be closely linked to the rendering manager or may be constructed as part of the rendering manager. The example rendering manager in FIG. 6 may be capable of referencing the rights management database 604 in order to control its processing of content files. In addition, the example rendering manager may include a secure clock 605, which may allow the rendering manager to rely on accurate time information when performing such tasks.

Figure 7:
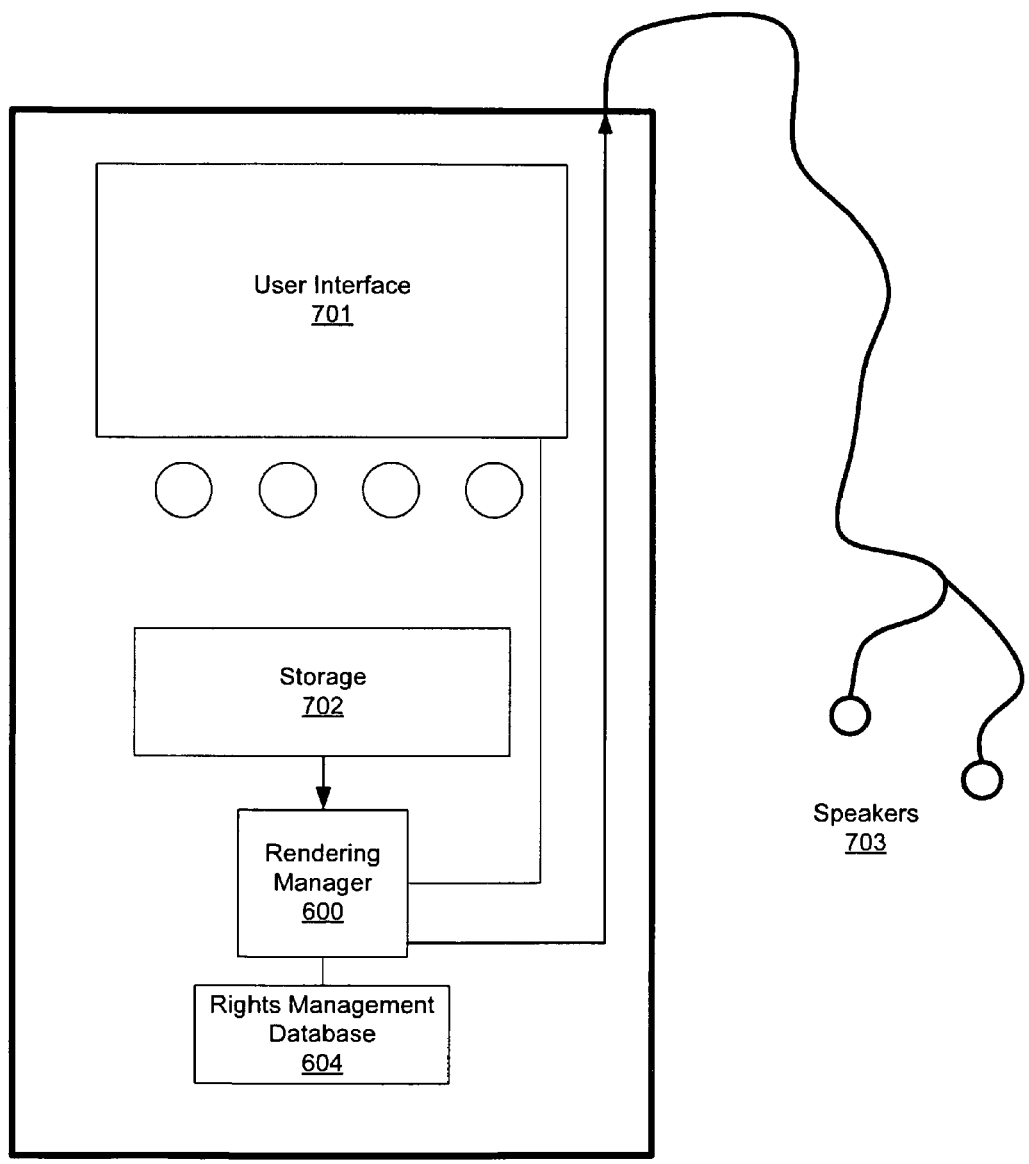
FIG. 7 illustrates an example system in accordance with an example embodiment of the present invention.

As explained above, such example rendering managers may be provided in connection with any kind of audio system. For example, FIG. 7 illustrates an example embodiment of the present invention in which an example rendering manager 600 is embedded in an audio system 700. As illustrated, the example rendering manager 600 may be connected to a rights management database 604, which also may be included in the audio system 700. As explained above, the rendering manager 600 may also be connected to a user interface 701, which may allow a user to control the functioning of the rendering manager. In addition, the rendering manager may be connected to a storage device 702 such as, e.g., flash RAM or optical or magnetic media, which may also be a part of the audio device 700. Such a storage device may store content files which the rendering manager may be capable of processing. In addition, the rendering manager may be configured to output a decoded signal to audio processing and generation systems which may be a part of the audio device 700. For instance, the rendering manager may be capable of outputting a signal which the audio device my playback using a set of speakers 703.

It is again noted that the examples provided in FIGS. 6 and 7 are not intended to be limiting but are provided for illustrative purposes only. Embodiments of the present invention may provide rendering managers in any useful configuration of software and hardware components and may provide rendering managers in connection with audio systems of any kind.

Presenting Content Files

Figure 8:
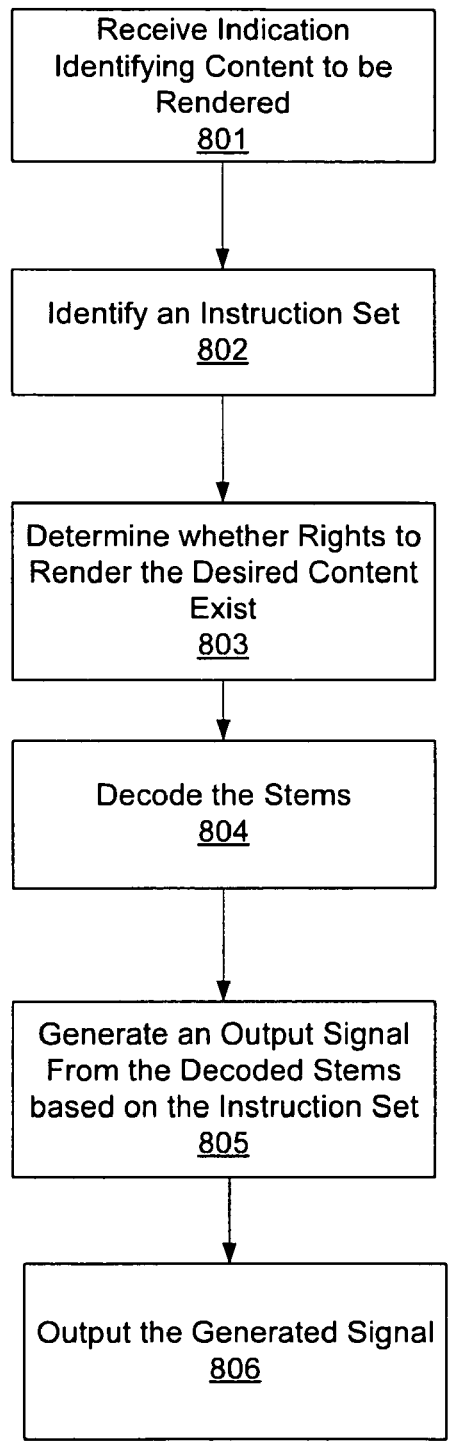
FIG. 8 illustrates an example procedure for rendering a content file in accordance with an example embodiment of the present invention.

Example embodiments of the present invention may also provide for processes by which content may be presented to consumers. FIG. 8 illustrates an example process in accordance with an example embodiment. For example, an example process may begin by receiving an indication from a user that some particular content is to be rendered 801. Such an indication may be received at a rendering manager for example. The indication may itself indicate an instruction set from a content file to use in rendering content, or may allow the selection of an instruction set to be made by the rendering system. In addition, the indication may itself indicate a particular content file or may identify content by some other means which may be later associated with a content file. For example, the indication may be of a song name which may itself be associated with a content file.

An example process may then identify an instruction set in order to facilitate playback 802. Selection may be made by a rendering manager which may select an instruction set from the content file which contains the content to be rendered. Such selection may be based on any of the criteria discussed more fully above. For example, selection of an instruction set may be based on user indication. Selection may also be based on environmental information available to a rendering manager, or may be based on a default indication encoded in the content file itself. Any other criteria may also be used for the selection of an instruction set, alone or in combination.

An example process may then determine whether the user has the rights necessary to take the action requested 803. For example, an example rendering manager processing the request may access a rights management database. The database may be searched for a record identifying the particular action sought. For instance, if a user requests playback using an instruction set designed to produce a live version of a song, a database may be referenced to identify whether a record exists in the database related to the live version's content or the instruction set. If no such record exists, the example process may decline to render the requested content. In example processes, an option may be presented allowing a user to obtain rights to the requested content.

If a user does have rights to the requested content, or is able to obtain such rights, an example process may then decode stems based on the instruction set 804. For example, an example process may interpret instructions encoded in the instruction set to identify stems to decode, to recognize how those stems are to be decoded, etc. An example process may then decode the stems required to render the content requested.

An example process may then produce the content for consumption 805. For example a rendering manager may assemble the content of the decoded stems for playback on an audio device. Such production may be accomplished according to an instruction set. For example, the content may be assembled according to an instruction set designed to render 2-channel audio. Such an instruction set may include any of the instructions described above, and may facilitate decoding of the stems into the proper channels. For example, instructions may be interpreted which may cause particular stems to be decoded into particular channels. As another example, the content may be produced according to instructions which adjust the levels of the stems being decoded, or which indicate a time at which a particular stem is to be rendered. It is noted that any of the instructions described above may control production.

According to an example process, the decoded content may then be output for presentation to a user 806. For example, a rendering manager may output a standard 2-channel analog audio signal which may then be amplified and used to drive a speaker system. Any other output may also be used, which may be based on the instructions in an instruction set. For instance, an instruction set may indicate that the output is to be in a 6-channel digitally encoded form. In such a case, a rendering manager, for example, may output the audio produced in an appropriately encoded form.

Mixing and Mastering Stations

Example embodiments of the present invention may provide systems and tools to create content files. In an example embodiment a system may be provided which may allow multiple sources of content to be formed together into the parts of a content file. For instance, an example embodiment of the present invention may provide for a mixing and mastering workstation. It is noted that the mixing and mastering components of the work station may be supplied in a single device or may be distributed over several specialized devices and may be implemented in hardware, software, or a combination of the two. Such a workstation may provide users with the ability to create content files.

For example, such a workstation may provide for the collection and storage of media elements. Thus the workstation may include a storage device which may include a database of media content and other associated content, e.g., the system may store, and have access to, a number of stems each of which encodes recorded media content. The system may also store descriptive data and other data associated with media content. For instance, the system may store album art, sheet music, music videos, interviews with artists, copyright information, and any other content elements. In addition, example embodiments may allow for the organization and association of related elements. For example, example embodiments may provide an association database, which may allow users to create and store associations between different content elements. As an example, such a system might allow a user to create an association between the stems of a single song, or between the stems that make up an album. In other examples, content such as sheet music might be associated with a particular stem.

In example embodiments of the present invention systems may be provided which may allow one or more users to create an original content file. For example, such a system may allow a user to select a number of stems that will be included in the content file. The system may also allow the user to control the form in which each stem is encoded in the content file, for example the particular encoding or compression method used, the bitrate of the encoding, etc. In addition, such example systems may allow users to create all of the necessary information to allow for playback of the content that the stems encode. For instance, a system may allow a user to create a set of instructions for inclusion in the file, which may instruct a rendering manager to use the stems of the content file in a specific manner.

As an example, an example system may allow a user to create instructions which may synchronize a number of stems such that they may be played back at an appropriate time. In so doing, the example system may itself allow for the embedding of time markers in the stems such that a rendering manager is able to synchronize the stems according to the instructions, and using the time markers. Further, example systems may allow users to create instructions affecting the playback of various stems. For instance, such a system may allow a user to create an instruction to playback a stem at a level higher than it was recorded at. Any of the other instructions discussed above may also be created and encoded in a content file.

In this manner, such example systems may allow users to perform the roles typically associated with the mixing and mastering of audio content. To facilitate these functions, example systems may include features enabling users to listen to the effects of the instructions they create on playback. For example, an example system may include a system to enable playback on a speaker system. Example systems may also provide an interface allowing users to quickly create instructions and listen to the effects of those instructions on playback. Using such systems users may be able to create instruction sets which may playback content encoded in a content file in a consistent and pleasing manner. Such systems may also provide other analytic tools which users may use to create content files. For example, example systems may provide tools which may allow users to view graphical representations of a sound recording, for example as a graph or a histogram. These systems may allow users to view, or analyze the resultant playback of an instruction set, the playback of a single or multiple stems in accordance with an instruction set (at once or in multiple simultaneous depictions), or the playback of multiple instruction sets.

In addition, example systems may allow users to create instructions for multiple content files simultaneously. For example, a user may wish to create an album of music, consisting of a number of individual songs. The user may also wish to create a content file for each song in the album, so that each song may be easily distributed. The user may, however, also wish to create instructions for each of the content files so that the songs encoded in them are played back with a consistent sound across the entire album. Accordingly, example systems may provide tools which may allow users to create instructions for multiple files at once, in addition to instructions for single files. Such systems may also allow users to listen to, or otherwise analyze the effects of those rules on playback from each of the content files. Therefore, such example systems may provide users with the tools needed to create consistent and pleasing sounding albums constructed from multiple content files.

Such systems may allow for the export of audio data to other system for processing. For example, example systems may include an output, which may allow for the transfer of audio data to a sound editing system, or other type of processing system. Example systems may also be able to receive audio data returned from such systems and may be able to encode that audio data in a content file.

Some embodiments may allow for the addition and association of other content in content files. For instance, example systems may allow a user to create or access metadata to be included in a content file. Such example systems may allow a user to associate metadata with portions of the content being stored in the content file. For instance, a user may be able to indicate that a particular piece of content is relevant to a five second portion of one of the stems to be encoded in the file. Example systems may provide an interface, for example a graphical display, enabling users to create, view, and edit associations made between portions of content and additional data. In addition, any of the kinds of additional data described more fully above, or any of the kinds of data and metadata usefully used in connection with media files may be supported by example systems.

Some embodiments of the present invention may include tools to automatically generate additional data. For example, systems may be provided which may create data descriptive of musical content, using the content itself. For instance, example embodiments may use Music Information Retrieval (MIR) to generate material for addition to a content file. For example, in the case of a content file which includes a number of stems for one song, MIR techniques may be employed to extract information about each stem, or about the song in general. As an example, if one of the stems encodes a piano, MIR may be used to analyze and automatically generate sheet music for the portion of the song played by the piano. Such sheet music may then be encoded in the content file, along with the stem.

In addition, in example embodiments, a manual editing system may be provided to allow for manual editing of automatically generated information. For instance, in the example above, MIR techniques may be used to automatically generate sheet music. The manual editing system may then allow a user to alter that sheet music before it is saved in the content file. In example embodiments the editing system may provide a user with the ability to listen to the recorded stem that was used to generate the sheet music or other element, at the same time the content is edited. In that way, a trained musician may, in effect, proofread and edit the generated elements. Once the generated element is placed in final form it may be saved for inclusion in the final content file.

The manual editing system may also permit users to create alternate versions of content. For example, a user might be able to create an alternative piece of sheet music for a stem. In such a case, MIR techniques may be used to create an original piece of sheet music, which in an example may be generated from a stem. In the example, the user may then be able to create a new piece of sheet music either from scratch or starting with the generated version. In either case, the user may be able to view both pieces of sheet music during editing. In this way, the user may be able to create a piece of sheet music that may be included in a content file as an extra feature. For example, the user may create a simpler, though still musically similar, piece of sheet music, or more than one. In an example, such a piece of sheet music might be included in the final content file and might enable consumers learning to play instruments to play along with a song recording at a comfortable difficulty level.

Example systems may provide users with the ability to create content files incorporating content, instructions, and other information which the user may have created and assembled. Such systems may allow users to select the specific manner in which a final content file is encoded. For example, a user may be able to specify that stems are to be encoded at a particular bitrate when inserted in the file. Example systems may be able to save and distribute content files created.

Figure 9:
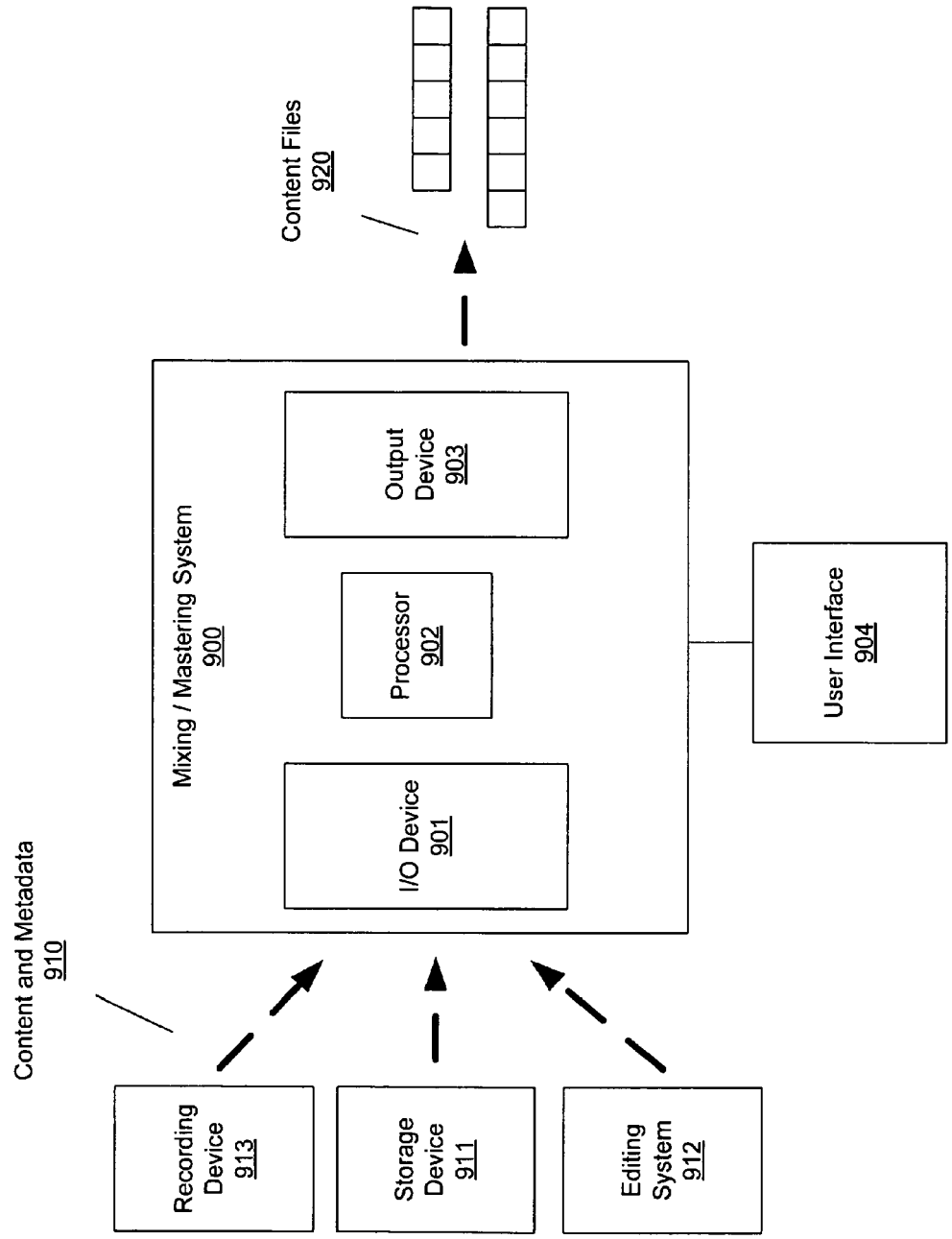
FIG. 9 illustrates an example mixing and mastering system in accordance with an example embodiment of the present invention.

For example, an example mixing/master system is illustrated in FIG. 9. In that example, the system may include a processor 902 which may control the functioning of the system and which may be capable of encoding content files. The example system may also include a memory 903, e.g., RAM, Flash RAM, etc., and a storage device 905, Flash RAM, optical or magnetic media, etc. The storage device may be configured to store content and other information which may be included in content files and may store the created content files themselves. In addition, the example system may include one or more I/O devices 901, which may facilitate communications with other systems and system components. For instance, the example system may be configured to communicate with other storage devices 911, which may contain content, information, or other material. The system may also be configured to communicate with recording devices 913 which may be capable of imputing recorded content, and editing systems 912, which may be capable of inputting edited content, and any other systems which may be capable of providing relevant material. In addition, the example system may be capable of outputting content files 920 once created. As explained above, the example system may also include a user interface 904, which may include any systems useful as an interface. For example, the example system may include a display device, a user input device, an audio device, etc. Again the system of FIG. 9 is intended as an example only. Example embodiments of the present invention may provide other mixing and mastering systems, as described herein, with any useful structure.

Creating a Content File

Figure 10:
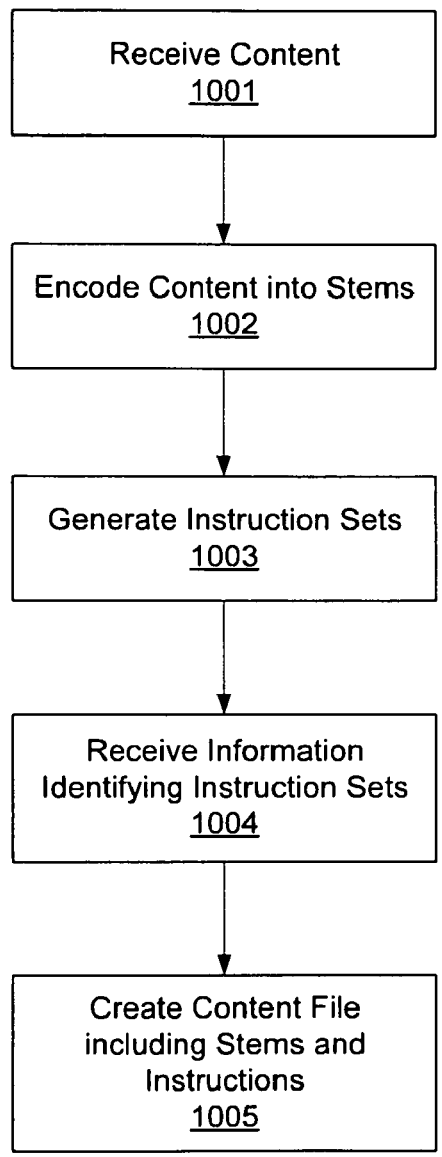
FIG. 10 illustrates an example procedure for creating a content file in accordance with an example embodiment of the present invention.

Example embodiments of the present invention may also provide for processes by which content files may be created and distributed. For example, FIG. 10 illustrates an example process in accordance with an example embodiment of the present invention. An example process may begin by receiving information identifying content to be encoded in a content file 1001. Such information may identify stems of encoded content to be placed in a content file. The content identified may, however, not be in the stems which will be encoded in the final content file.

Accordingly, example embodiments may next convert the content identified into stems 1002. In order to do so information may be received indicating which portions of the identified content are to be encoded in each particular stem. For example, audio content for a particular stem may be divided over two files which are to be encoded together in some manner to form a single stem. Information may also be received indicating the type of encoding to be used for each stem. For instance, an indication may be received that a particular stem is to be encoded according to an MP3 format at a specified bitrate. In addition, additional information may be encoded in a stem at this point. For instance, in example embodiments, a time signal may be encoded in each stem allowing multiple stems to be synchronized.

An example process may then allow for the creation of one or more instruction sets for inclusion in the content file 1003. For instance, an instruction set directing a rendering manager to produce 2-channel audio from the content of the content file may be received. Such an instruction set may be created by a user using systems of the type described above, or using other systems, or may be created manually. In addition, some instruction may be automatically generated. For example, if a particular stem has been encoded in an MP3 format, in example embodiments, an instruction may automatically be created instructing a rendering manager to decode the stem accordingly. Any useful instructions may be included in such instruction sets, for example any of the types of instructions described above.

In example processes information identifying individual instruction sets may also be received 1004. For example, information identifying an instruction set as a 2-channel instruction set, or as a "edited" version instruction set. Such identifiers may be stored in the content file. In an example process information identifying a default instruction set may be received. For instance if two instruction sets have been received, e.g., one set to render 2-channel audio and another to render 6-channel audio, one instruction set, for example the 2-channel set may be identified as a default instruction set. As described above, it is possible that more than one instruction set may be identified as a default instruction set, or that none may. After receiving the indication the instruction set may be labeled as a default instruction set, and the default information encoded in the content file.

In example embodiments, additional information may also be received. For instance, metadata related to the content may be received. In other embodiments, copyright information may be received. It is noted that any of the types of information identified above may be received for inclusion in a content file, and any other types of information which may usefully be included in such a file. In addition, information associating such data with portions of the content may also be received. For example, information associating copyright information with a portion of a stem may be received. Both the additional information itself and the association of that information with content may be encoded in the content file.

In example embodiments, some information may be automatically generated from the content to be included in content file. For instance, in an example embodiment, MIR techniques may be utilized, as discussed above, to generate, e.g., sheet music from the stems to be included in a content file. Such generated information may be automatically associated with portions of the content if appropriate. In addition, such generated information may be manually edited before being encoded in a content file. Once such information is finalized, it may be encoded in the content file along with any information associating it with portions of the content.

In example embodiments, a content file may then be generated 1005. All of the identified elements of the file, including, for example, the stems, instruction sets, and other information, may be encoded in the file. Descriptive information may also be encoded in the file. For instance, a file version number, generation date, a name of the content, etc., may be encoded in the file. The final file may then be stored and distributed as appropriate.

It will be appreciated that all of the disclosed methods and procedures described herein may be implemented using one or more computer programs or components. These components may be provided as a series of computer instructions on any conventional computer-readable medium, including RAM, ROM, flash memory, magnetic or optical disks, optical memory, or other storage media. The instructions may be configured to be executed by a processor, which when executing the series of computer instructions performs or facilitates the performance of all or part of the disclosed methods and procedures.

It will further be appreciated that the above-described methods and procedures may be provided using the systems disclosed herein, or on other types of systems. The methods and procedures, unless expressly limited, are not intended to be read to require particular actors or systems performing particular elements of the claimed methods.

In the preceding specification, the present invention has been described with reference to specific example embodiments thereof. It will, however, be evident that various modifications and changes may be made thereunto without departing from the broader spirit and scope of the present invention as set forth in the claims that follow. The specification and drawings are accordingly to be regarded in an illustrative rather than restrictive sense. It is also noted that the subject matter headings used throughout the specification are intended only as an organizational aid and are not to be read as limiting the scope of the disclosure.

The invention claimed is:

1. A system for the playback of content files, comprising:
a memory storing a content file including a plurality of stems, each stem encoding a portion of the audio of a sound recording, multiple stems in the plurality of stems representing different portions of the sound recording for the same time period, the content file also including a set of instructions controlling playback of the stems;

a decoder configured to decode the stems according to the set of instructions to create an audio output signal; and an output device configured to output an audio output based on the audio output signal.

2. The system of claim 1, wherein the content file includes multiple different files for the same sound recording, and wherein the set of instructions controls the playback of stems from the multiple different files, the decoder being further configured to decode the stems from the multiple files according to the set of instructions to create the audio output signal.

3. The system of claim 1, wherein at least a subset of the stems represent instrumental tracks of the sound recording for respective instruments.

4. The system of claim 1, wherein at least a subset of the stems represent spatial arrangement of sound for the sound recording.

5. The system of claim 1, wherein at least a subset of the instructions represent spatial arrangement of sound for the sound recording.

6. The system of claim 1, wherein at least a subset of the stems represent multiple versions of the same portion of the sound recording.

7. The system of claim 1, wherein the content file further contains multiple sets of instructions corresponding to different formats of the audio output signal for the sound recording, the decoder being further configured to produce different corresponding formats of the audio output signal for each of the multiple sets of instructions.

8. The system of claim 1, wherein the content file further contains multiple sets of instructions corresponding to different configurations of the stems in terms of volume, effects, or position, each configuration representing a different version of the sound record, the formats of the audio output signal for the sound recording, the decoder being further configured to produce different versions of the audio output signal for each of the multiple sets of instructions.

9. The system of claim 8, wherein the decoder is further configured to choose one of the multiple sets of instructions to control the decoding of the stems based on an environmental parameter.

10. The system of claim 1, wherein the content file further includes rights management information, the rights management information configured to indicate how the stems in the content file may be decoded for playback, the decoder being further configured to prevent playback of the content file in a manner indicated as being forbidden by the rights management information.

11. The system of claim 10, wherein the rights management information indicates whether playback of a particular stem is allowed.

12. The system of claim 11, wherein the decoder is configured to prevent playback of the particular stem if the rights management information indicates playback of that stem is not allowed.

13. The system of claim 10, wherein the rights management information indicates whether playback using a particular instruction set in the content file is allowed.

14. The system of claim 13, wherein the decoder is configured to prevent playback of the content file using an instruction set that the rights management information indicates is not permitted.

15. The system of claim 10, wherein the right management information indicates playback using a particular instruction set is required in certain conditions.

16. The system of claim 15, wherein the decoder is further configured, responsive to the detection of the certain conditions, to only allow playback of the content file using the particular instruction set.

17. The system of claim 10, wherein the decoder is configured to allow the creation of an audio output signal without a particular stem, only if such creation without the particular stem is indicated as being permitted by the rights management information.

18. The system of claim 10, wherein the decoder is configured to allow the creation of an audio output signal with less than all the stems in the content file, only if such creation with less than all the stems in the content file is indicated as being permitted by the rights management information.

19. The system of claim 1, wherein the instruction set is configured to indicate that certain stems should be turned off in playback of the content file, and wherein the decoder is configured to create the audio output signal, based on the instruction set, without the stems that the instruction set indicates should be turned off.

20. The system of claim 1, wherein the instruction set is configured to indicate that certain stems should be turned on in playback of the content file, and wherein the decoder is configured to create the audio output signal, based on the instruction set, using the stems that the instruction set indicates should be turned on.

21. A method for rendering a content file, comprising:
receiving a content file including a plurality of stems, each stem encoding a portion of the audio of a sound recording, multiple stems representing different portions of the sound recording for the same time period, the content file also including a set of instructions controlling playback of the content file;
creating an audio output signal by decoding the stems according to the set of instructions; and
rendering the audio output signal.

22. An article of manufacture comprising a non-transitory storage device having recorded thereon computer executable instructions that, when executed by a processor, cause the performance of a method for rendering a content file, the method comprising:
receiving a content file including a plurality of stems, each stem encoding a portion of the audio of a sound recording, multiple stems representing different portions of the sound recording for the same time period, the content file also including a set of instructions controlling playback of the content file;
creating an audio output signal by decoding the stems according to the set of instructions; and
rendering the audio output signal.

* * * * *